United States Patent [19]

Staszewski et al.

[11] Patent Number: 4,955,784

[45] Date of Patent: Sep. 11, 1990

[54] APPARATUS FOR UNSTACKING CROSS-NESTED ARTICLES

[75] Inventors: Edward T. Staszewski, Chicago Ridge; Steve J. Reynolds, Tinley Park; Richard C. Vinyard, Burbank; Bennie E. Galloway, Plano, all of Ill.

[73] Assignee: Advanced Pulver Systems, Inc., Chicago Ridge, Ill.

[21] Appl. No.: 225,965

[22] Filed: Jul. 29, 1988

[51] Int. Cl.$^5$ ............................................. B65G 59/10
[52] U.S. Cl. .................................. 414/796.4; 198/414; 198/416; 414/796; 414/797.2
[58] Field of Search ............... 198/374, 399, 414, 416; 414/795.6, 796, 796.4, 797.2

[56] References Cited

U.S. PATENT DOCUMENTS

| | | |
|---|---|---|
| Re. 31,858 | 4/1985 | Euverard et al. |
| 2,108,457 | 2/1938 | Tobia |
| 2,306,713 | 12/1942 | Prucha |
| 2,761,542 | 9/1956 | Pagdin .................... 198/416 |
| 2,975,911 | 3/1961 | Wedensky |
| 3,128,868 | 4/1964 | Bowen ................... 198/416 X |
| 3,180,522 | 4/1965 | Marasso ................. 221/106 |
| 3,422,970 | 1/1969 | Faerber |
| 3,487,959 | 1/1970 | Pearne et al. |
| 3,538,989 | 11/1970 | Dean |
| 3,598,254 | 8/1971 | Meisoll ................... 414/796.7 |
| 3,656,635 | 4/1972 | Schafer et al. |
| 3,669,283 | 6/1972 | Brown, Jr. |
| 3,776,398 | 12/1973 | Stuart et al. |
| 3,792,784 | 2/1974 | Mosterd |
| 3,834,298 | 9/1974 | Paschal et al. |
| 3,912,070 | 10/1975 | Cronk et al. |
| 3,917,082 | 11/1975 | Howard et al. ............ 414/796.4 |
| 3,933,254 | 1/1976 | Pulver et al. |
| 3,987,911 | 10/1976 | Euverard et al. .......... 414/795.6 X |
| 4,161,368 | 7/1979 | Batzdorff |
| 4,252,484 | 2/1981 | Benson et al. ............ 414/795.6 |

FOREIGN PATENT DOCUMENTS 3705561  2/1988  Fed. Rep. of Germany ...... 198/414

*Primary Examiner*—Robert J. Spar
*Assistant Examiner*—Janice Krizek
*Attorney, Agent, or Firm*—Emrich & Dithmar

[57] ABSTRACT

An apparatus for unstacking cross-nested articles includes an elevator which raises the stack as articles are removed two-at-a-time from the top thereof by a continuous-chain transfer conveyor. The transfer conveyor carries the removed articles to a discharge station where they are dropped onto two vertically spaced-apart discharge conveyors. In one embodiment, the upper discharge conveyor comprises laterally spaced-apart tracks arranged so that the bottom article drops therethrough to the lower discharge conveyor, while the top article is caught on the upper discharge conveyor. A finger on one of the conveyors turns selected articles 90° so that all articles are aligned in the same direction as they exit the lower conveyor. In another embodiment both discharge conveyors comprise laterally spaced-apart tracks, and a turntable is vertically movable between the tracks to lower the articles onto the discharge conveyors, the turntable rotating 90° between the discharge conveyors to reorient the lower article.

15 Claims, 13 Drawing Sheets

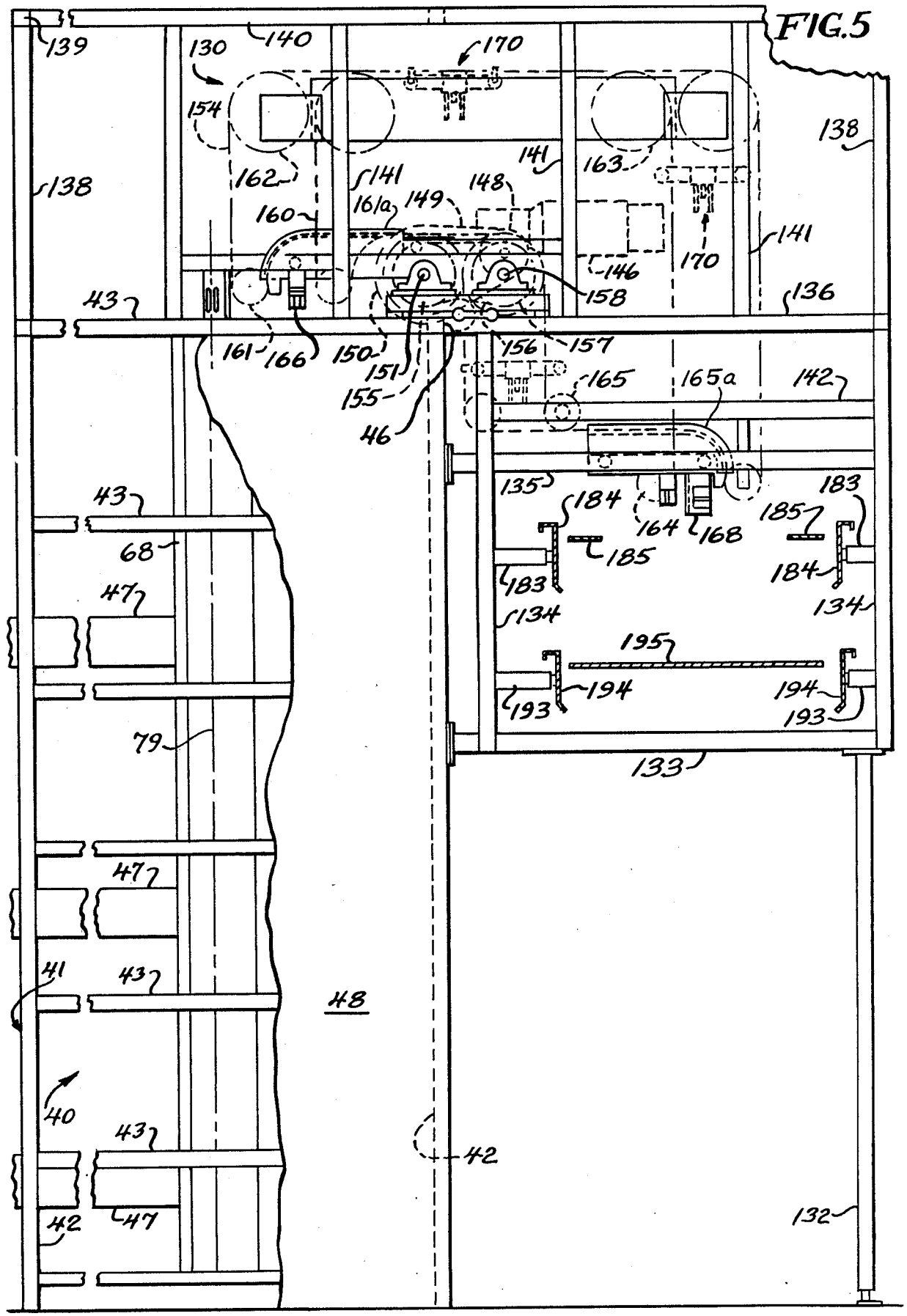

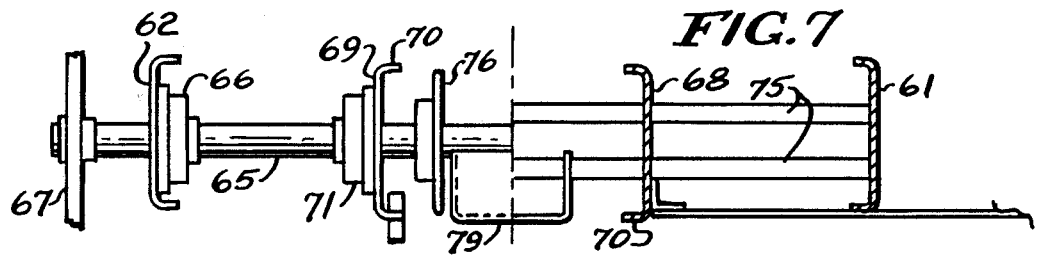
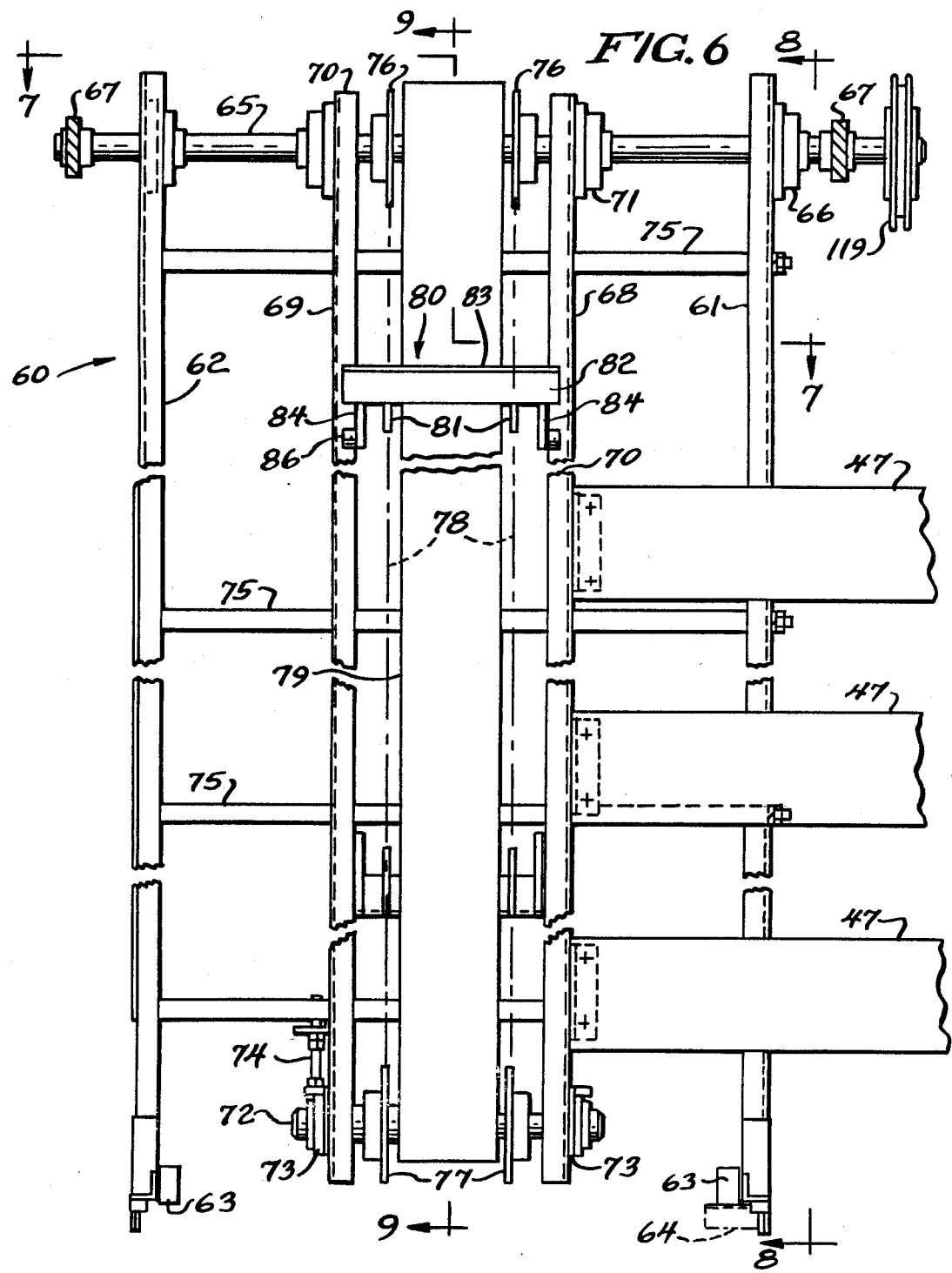

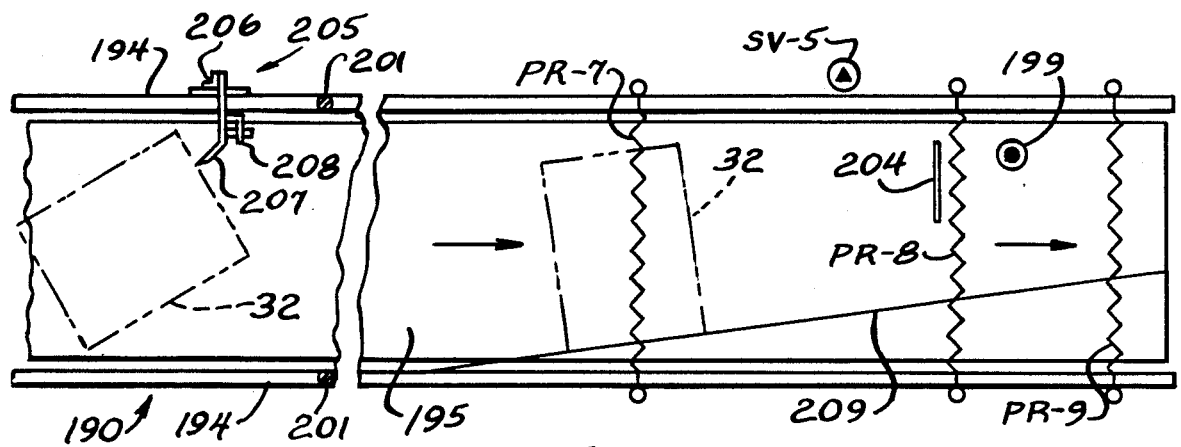
FIG. 13
FIG. 14
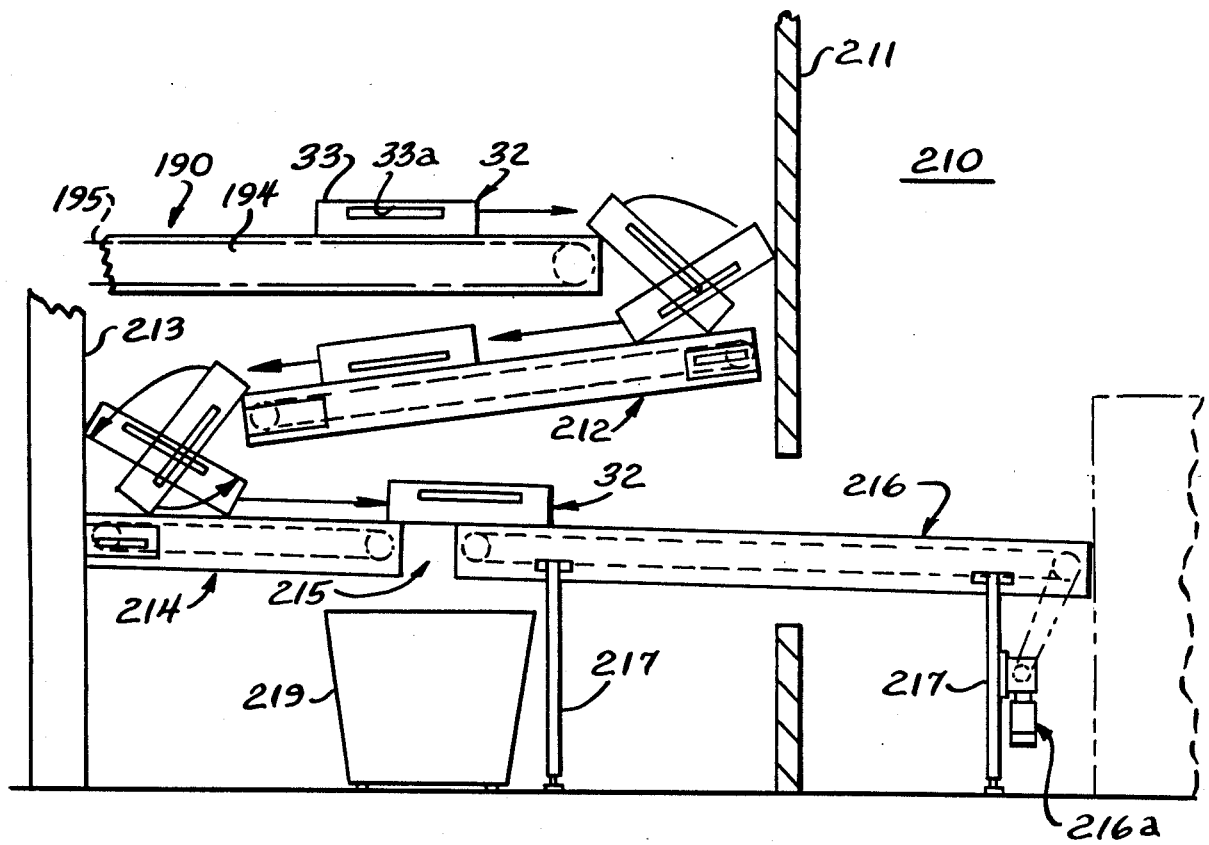

APPARATUS FOR UNSTACKING CROSS-NESTED ARTICLES

Microfiche Appendix

There is submitted herewith a Microfiche Appendix setting forth in "rung logic" notation a listing of a computer program for operating the control circuit 250 for the unstacking apparatus 30.

BACKGROUND OF THE INVENTION

1. Field of the Invention

The present invention relates to unstacking apparatus, i.e., apparatus for removing articles from a stack. In particular, the present invention relates to apparatus for unstacking "cross-nested" articles, i.e., articles which are arranged such that each article in the stack is turned 90° about the axis of the stack with respect to adjacent articles.

2. Description of the Prior Art

Many types of unstacking devices are known. One such device, disclosed in U.S. Pat. No. Re. 31,858, comprises a pair of laterally spaced-apart endless chains having article carriers mounted therebetween for removing articles from the top of the stack and/or adding articles to the top of the stack. That apparatus is specifically arranged so that the articles are moved only translationally, the conveyor paths being designed so as to provide a transfer portion at the top of the stack wherein the carriers and carried articles remain stationary for a time while the endless chain conveyors keep moving. But that unstacking device is designed for use with stacks in which all the articles are oriented in the same direction, the articles being removed from the stack one-at-time.

Unstackers are also known for unstacking cross-nested articles or groups of articles. A typical application is in unstacking courses of bricks in which alternate courses are oriented at right angles to each other. But these devices typically remove one layer of articles at a time and typically require either rotating the entire stack, or providing complicated transfer mechanism which rotates the layer after it is removed from the stack but before it is delivered to a discharge apparatus.

SUMMARY OF THE INVENTION

It is a general object of the present invention to provide an improved unstacking apparatus which avoids the disadvantages of prior devices while affording additional structural and operating advantages.

An important feature of the invention is the provision of an unstacking apparatus which is of relatively simple and economical construction and which is uniquely adaptable for unstacking cross-nested articles.

A further feature of the invention is the provision of an apparatus of the type set forth which does not require rotation of the stack or of the transfer apparatus which removes articles from the stack.

Still another feature of the invention is the provision of an apparatus of the type set forth which requires only orientation of selected individual articles after they have been delivered to a discharge station.

These and other features of the invention are attained by providing apparatus for unstacking elongated articles from a stack of articles in which each article has the longitudinal axis thereof disposed perpendicularly to the longitudinal axis of adjacent articles in the stack, the apparatus comprising: transfer means for removing the top two articles from the stack simultaneously and conveying them to a discharge station, means at the discharge station for separating the two removed articles, means for reorienting one of the separated articles so that its longitudinal axis extends in substantially the same direction as that of the other separated article, and discharge means for carrying the two articles sequentially from the discharge station.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 5 is a fragmentary, side elevational view in partial vertical section of the unstacking apparatus of FIG. 4, viewed generally along the line 5—5 therein;

FIG. 6 is a further enlarged, fragmentary, side elevational view of one side of the stack elevator assembly of the unstacking apparatus of FIG. 3, viewed generally along the line 6—6 therein;

FIG. 7 is a view in horizontal section, taken along the line 7—7 in FIG. 6;

FIG. 13 is an enlarged, fragmentary, top plan view of the lower discharge conveyor of the unstacking apparatus of FIGS. 1 and 2;

FIG. 14 is an enlarged, fragmentary, side elevational view, in partial vertical section of the tumbling assembly of the unstacking apparatus of FIGS. 1 and 2;

DESCRIPTION OF THE PREFERRED EMBODIMENTS

Figure 1:
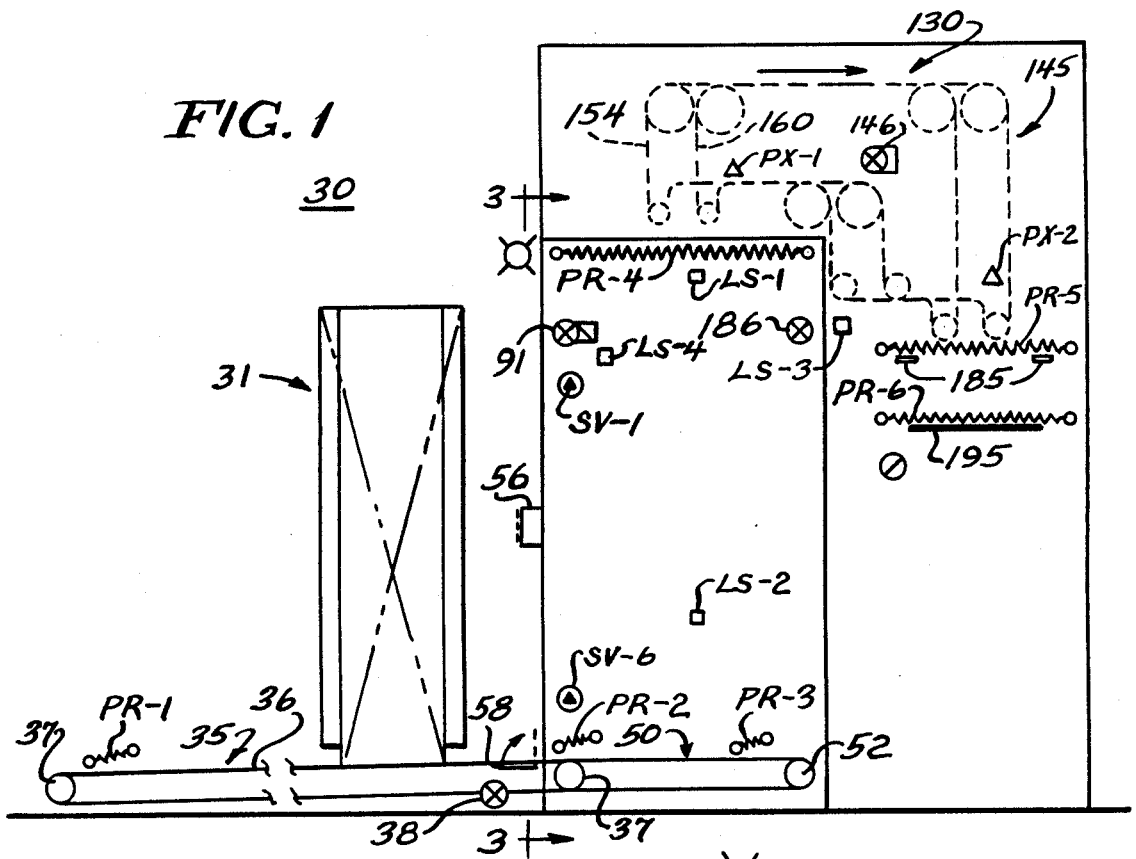
FIG. 1 is a side elevational, partially diagrammatic view of an unstacking apparatus constructed in accordance with and embodying the features of a first embodiment of the present invention.
Figure 2:
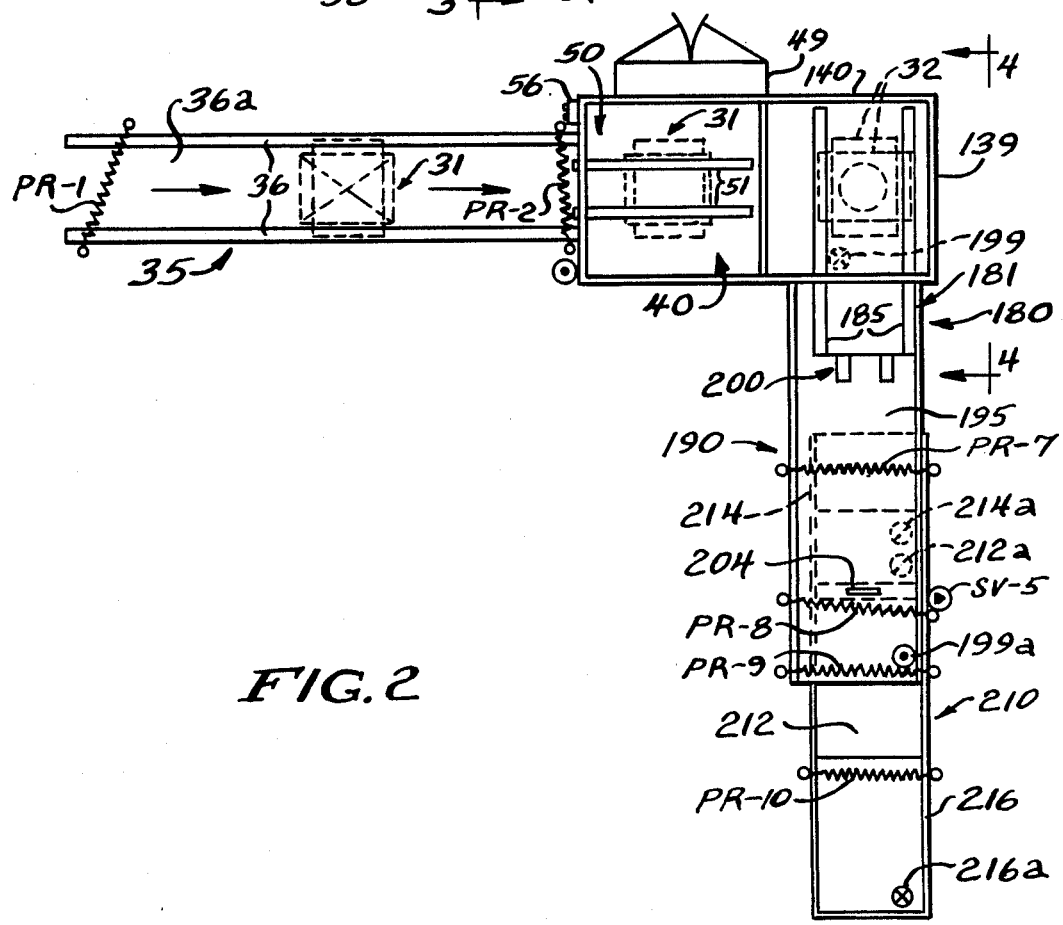
FIG. 2 is a reduced, top plan, partially diagrammatic view of the unstacking apparatus of FIG. 1.

Referring to FIGS. 1 and 2, there is illustrated a partially diagrammatic view of an unstacking apparatus, generally designated by the numeral 30, constructed in accordance with and embodying the features of a first embodiment of the present invention. The unstacking apparatus 30 is designed for handling a cross-nested stack 31 of baskets 32 or other similar elongated containers, such as pans, trays or the like. While the present invention is disclosed in connection with the unstacking of such containers, which are typically used in the baking industry, it will be understood that the principles of the present invention could also be applied to the unstacking of other types of elongated articles.

Figure 3:
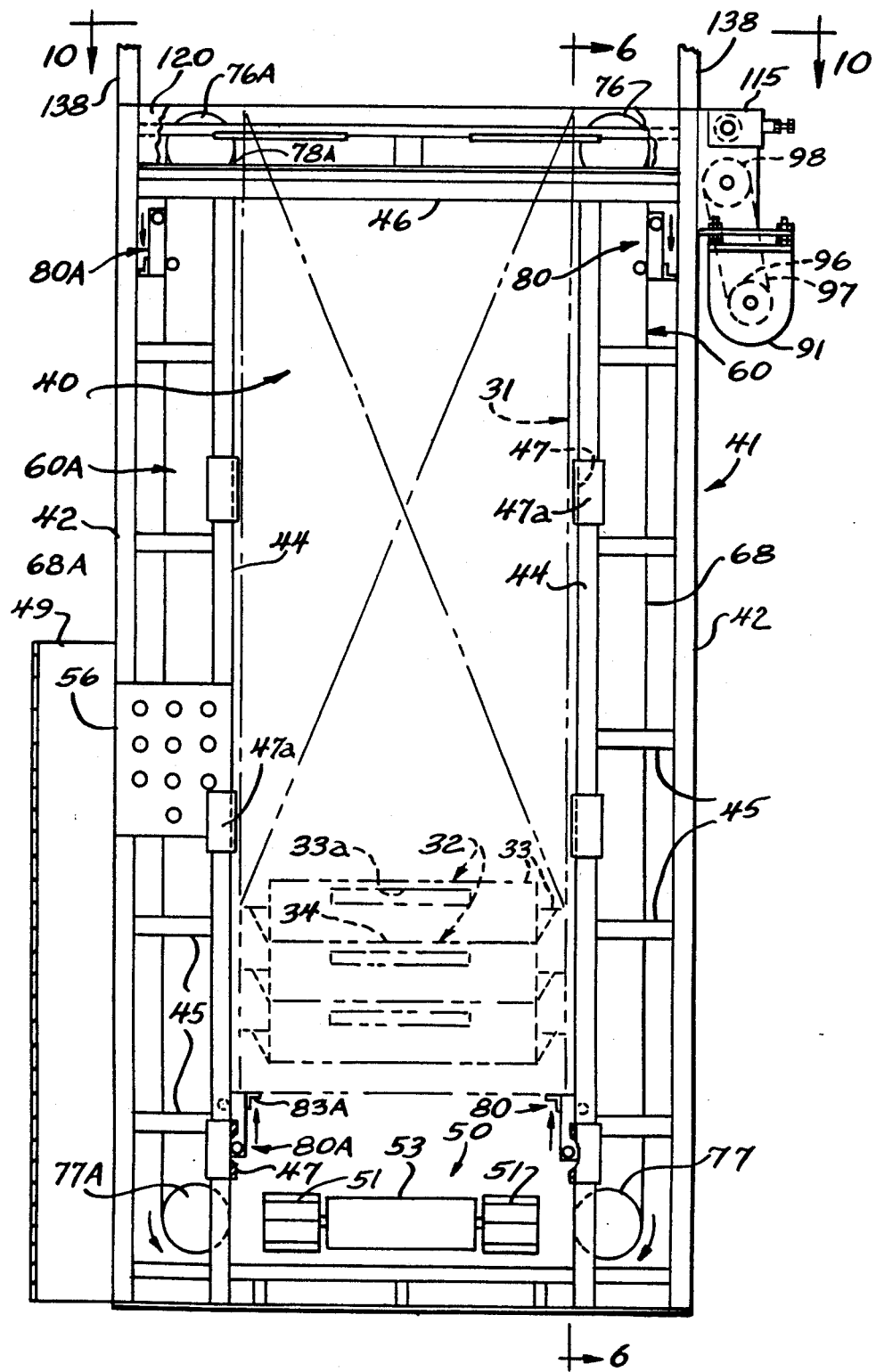
FIG. 3 is an enlarged, fragmentary, end elevational view of the unstacking apparatus of FIGS. 1 and 2, viewed generally along the line 3—3 in FIG. 1.
Figure 4:
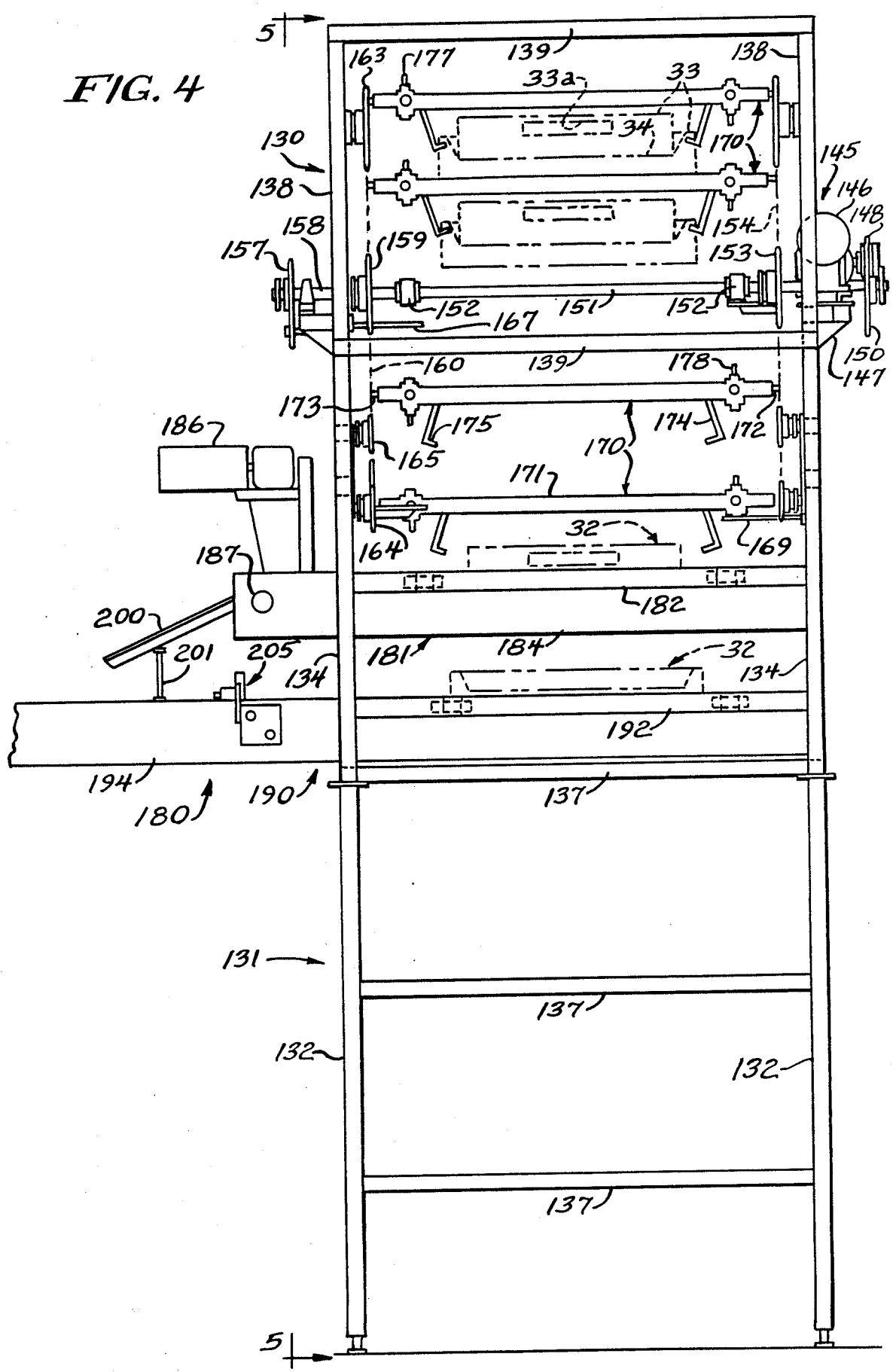
FIG. 4 is an enlarged, fragmentary, end elevational view of the unstacking apparatus of FIGS. 1 and 2, viewed generally along the line 4—4 in FIG. 2.

Referring also to FIGS. 3, 4 and 14, for example, each of the baskets 32 is generally rectangular in shape, including a pair of relatively high end walls 33, each having an elongated slot 33a therein, and a pair of relatively low side walls 34. The stack 31 is cross-nested, i.e., alternate ones of the baskets 32 therein have the longitudinal axes thereof oriented perpendicular to each other. Thus, the bottom of each basket 32 is nested across the low side walls 34 of the underlying basket, thereby to maximize the number of baskets which can be included in a stack of a given height.

The unstacking apparatus 30 includes an infeed conveyor 35 which carries stacks 31 from associated stacking equipment (not shown). The infeed conveyor 35 includes an endless pair of laterally spaced-apart conveyor belts or tracks 36, which may be provided with a plate 36a therebetween at a level substantially coplanar with or slightly below the plane of the upper flight of the belts 36. The belts 36 are wrapped around sprockets 37, which are driven by a suitable electric drive motor 38 for moving the stacks 31 in the direction of the arrows in FIG. 2. A photo eye PR-1 is provided at the entry end of the infeed conveyor 35, while a photo eye PR-2 is provided at the exit end thereof, which is also at the entry end of a stack-receiving bay 40.

Referring now also to FIGS. 3 and 5, the stack-receiving bay 40 includes an upright, generally rectangular frame 41 which includes two pairs of corner posts 42, the pairs being spaced apart longitudinally of the path traveled by the stack 31, and the posts of each pair respectively straddling that path. The side ones of the corner posts 42 are interconnected by a plurality of horizontally extending and vertically spaced-apart side bars 43 (FIG. 5). Respectively disposed a predetermined distance laterally inwardly of the corner posts 42 are four inner posts 44, which are respectively connected to the adjacent corner posts 42 by a plurality of vertically spaced-apart horizontal rungs 45. The upper ends of the inner posts 44 and their adjacent corner posts 42 are interconnected by laterally extending top bars 46. Fixedly secured to the pair of inner posts 44 disposed at the entry end of the stack receiving bay 40 are three vertically spaced-apart pairs of laterally spaced-apart guide plates 47, each of which extends rearwardly approximately one-third of the way into the bay 40 and extends forwardly beyond the inner posts 44. Each of the guide plates 47 is terminated in a laterally outwardly flared leading end tip 47a, for guiding the associated stack 31 accurately into position in the stack-receiving bay 40. The outer sides of the frame 41 are respectively covered by rectangular panels 48 (FIG. 5), on one of which is mounted a control box 49 (FIG. 3) which includes the control circuitry for the unstacking apparatus 30.

Disposed in the stack-receiving bay 40 is a bay conveyor 50 which is arranged as an extension of the infeed conveyor 35. More specifically, the bay conveyor 50 includes a pair of laterally spaced-apart endless tracks or belts 51 which are laterally spaced apart a distance less than the pacing between the infeed conveyor belts 36. Each of the tracks 51 is wound around a rear sprocket 52 and a forward sprocket which is diagrammatically illustrated as being one of the sprockets 37 of the infeed conveyor 35, but which may, in fact, be a separate sprocket mechanically coupled to the sprocket 37 and driven simultaneously therewith by the motor 38. A support plate 53 is preferably disposed between the tracks 51. A photo eye PR-3 is disposed adjacent to the inner end of the bay conveyor 50. A push-button control box 56 is mounted on the front of the frame 41 between one of the corner posts 42 and its adjacent inner post 44.

Preferably, a gate 58 is provided adjacent to the entry end of the bay conveyor 50, and operates under the control of a solenoid valve SV-6 for movement between open and closed positions, respectively indicated in solid and broken lines in FIG. 1, for selectively stopping a stack along the infeed conveyor 35 and preventing it from entering the stack-receiving bay 40, as will be explained in greater detail below. When the gate 58 is in its stop position, the infeed conveyor 35 continues to run and slides beneath the stopped stack 31. The photo eye PR-3 signals that the stack has completely entered the stack-receiving bay 40 and is in position for unstacking. There is also provided a limit switch LS-4 in the stack-receiving bay 40 which indicates whether or not the stack 31 is properly aligned in the bay 40.

Referring now also to FIGS. 6-9, there is mounted in the stack-receiving bay 40, a pair of elevator assemblies, respectively generally designated 60. The elevator assemblies 60 are respectively disposed on opposite sides of the bay conveyor 50 and are constructed substantially as mirror images of each other. Accordingly, only the one on the right-hand side of the bay, as viewed in FIG. 3, will be explained in detail. In those figures where portions of both the right and left elevator assemblies 60 are shown, corresponding parts thereof will bear the same reference numbers, but the numbers for the left-hand assembly will be designated by the suffix "A".

The elevator assembly 60 includes a pair of elongated, upstanding support channels 61 and 62 which are fixedly secured inside the frame 41 by suitable means (not shown). The lower ends of the support channels 61 and 62 carry cam followers 63 (FIG. 6) which are disposed for engagement with guide rails 64 on the frame 41. Extending through horizontally aligned openings adjacent to the upper ends of the support channels 61 and 62 is a drive shaft 65, which is supported adjacent to the opposite ends thereof by bearings 66, respectively mounted in elongated support beams 67 which extend transversely across the top of the frame 41 (see FIG. 10). The elevator assembly 60 also includes a pair of upstanding guide channels 68 and 69 which are disposed between the support channels 61 and 62 substantially parallel thereto, each of the channels 68 and 69 having a guide flange 70 which extends along the full length of the inner and outer edges thereof, the channels 68 and 69 being arranged so as to open toward each other. The drive shaft 65 extends through bearings 71 respectively carried by the channels 68 and 69 adjacent to the upper ends thereof. A short idler shaft 72 extends through bearings 73 carried adjacent to the lower ends of the guide channels 68 and 69. There is also provided a take-up assembly 74 for adjusting the vertical position of the idler shaft 72. The support channels 61 and 62 and the guide channels 68 and 69 are held in position by a plurality of vertically spaced-apart pairs of spacer tubes 75 which are aligned substantially parallel to the drive shaft 65, the tubes 75 of each pair being spaced apart laterally of the stack-receiving bay 40.

The drive shaft 65 carries a pair of upper sprockets 76, while the idler shaft 72 carries a pair of lower sprockets 77, the sprockets 76 and 77 being respectively disposed just inside the guide channels 68 and 69. Engaged around the sprockets 76 and 77 are two endless elevator chains 78 which form substantially vertically-disposed endless loops, the chains 78 being spaced apart by a center channel 79.

Carried by the elevator chains 78 and equidistantly spaced apart along the loops thereof are two flight assemblies 80, which are substantially identical in construction, wherefore only one will be described in detail. Each of the flight assemblies 80 includes a pair of chainattachment lugs 81 which are respectively secured to the elevator chains 78. Spanning the lugs 81 and fixedly secured thereto is an elongated angle plate 82, having a rectangular lift flange 83 which is disposed substantially horizontally when the flight assembly 80 is disposed along one of the vertical flights of the chains 78. Fixedly secured to the angle plate 82 and depending therefrom, respectively adjacent to the opposite ends thereof, are two rectangular guide plates 84, which are arranged so as to be disposed respectively closely adjacent to the distal edges of the flanges 70 of the guide channels 68 and 69. Each of the guide plates 84 carries respectively at diagonally opposed corners thereof an inner roller 85 and an outer roller 86 adapted for rotational movement about the axes of suitable stub shafts (not shown) for rolling engagement, respectively, with the inner and outer surfaces of the associated flange 70. Thus, it will be appreciated that, in use, the rollers 85 and 86 cooperate with the guide channels 68 and 69 accurately to position the flight assemblies 80 laterally of the stack-receiving bay 40.

Figure 8:
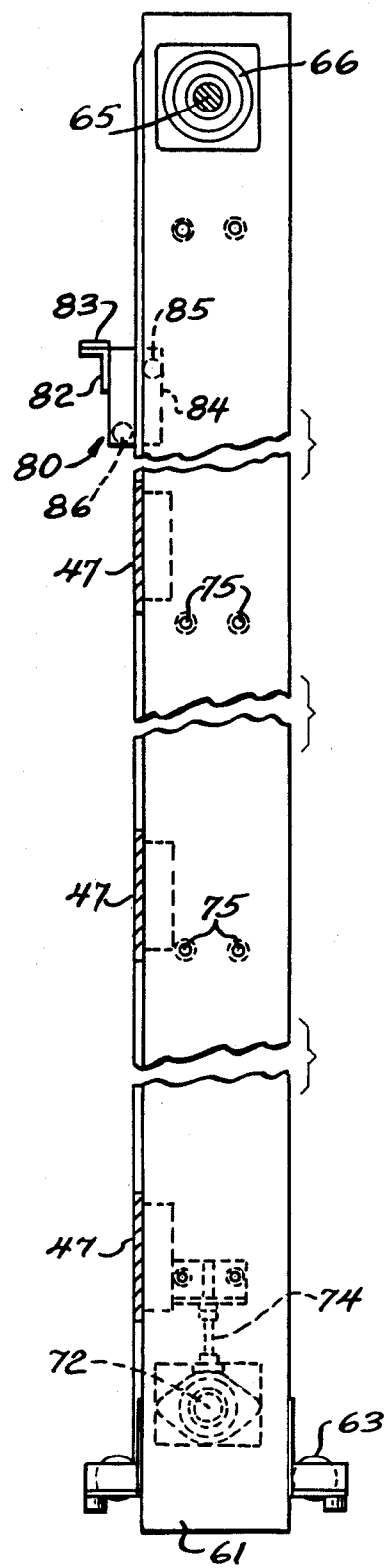
FIG. 8 is a further enlarged fragmentary view in vertical section, taken along the line 8—8 in FIG. 6.
Figure 9:
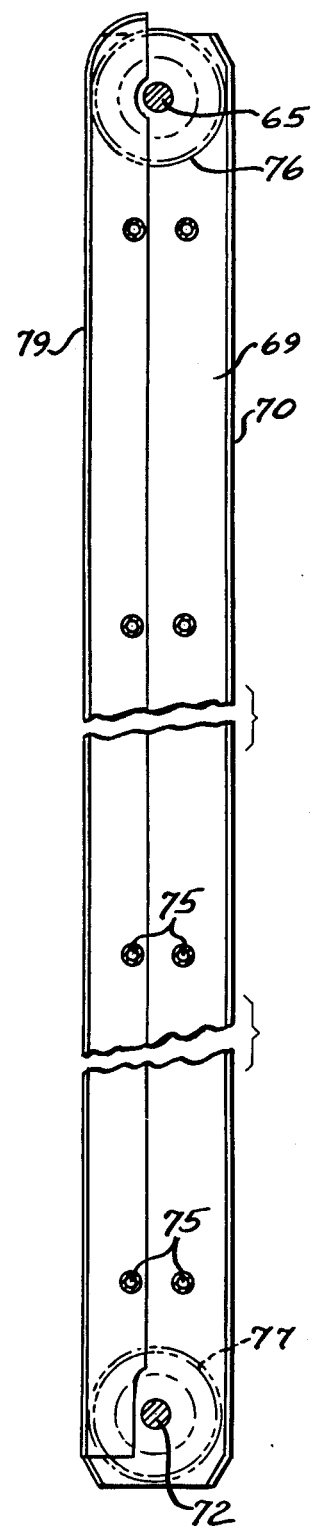
FIG. 9 is a further enlarged fragmentary view in vertical section, taken along the line 9—9 in FIG. 6.

When the drive shaft 65 is rotated in a clockwise direction, as viewed in FIG. 8, the flight assemblies 80 are carried vertically upwardly along the inner flights of the chains 78 and downwardly along the outer flights thereof. It will be appreciated that, when one of the flight assemblies 80 is disposed at the top of the endless chain loop, the other is disposed at the bottom thereof.

The elevator assembly 60 also includes a pair of limit switches LS-1 and LS-2 (see FIG. 1), which are tripped by the flight assemblies 80. More specifically, the limit switch LS-1 is tripped by a flight assembly 80 after it is moved beyond its maximum height and indicates that the other flight assembly 80 is in position to elevate a stack 31 of baskets 32. The limit switch LS-2 tripped by a flight assembly 80 on its way down and indicates that the following flight assembly 80 has elevated its stack 31 sufficiently for the next stack 31 to enter the stack-receiving bay 40.

In operation, it will be appreciated that, as the flight assemblies 80 and 80A of the two elevator assemblies 60 and 60A move around the bottoms of the chain loops defined by the lower sprockets 77 and 77A, the lift flanges 83 and 83A thereof come up beneath a stack 31 of baskets 32 which is located on the bay conveyor 50 in the stack receiving bay 40, as is best illustrated in FIG. 3. It will be appreciated that the tracks 51 of the bay conveyor 50 are spaced inwardly from the inner posts 44 a distance sufficient to be cleared by the flight assemblies 80 and 80A.

Figure 10:
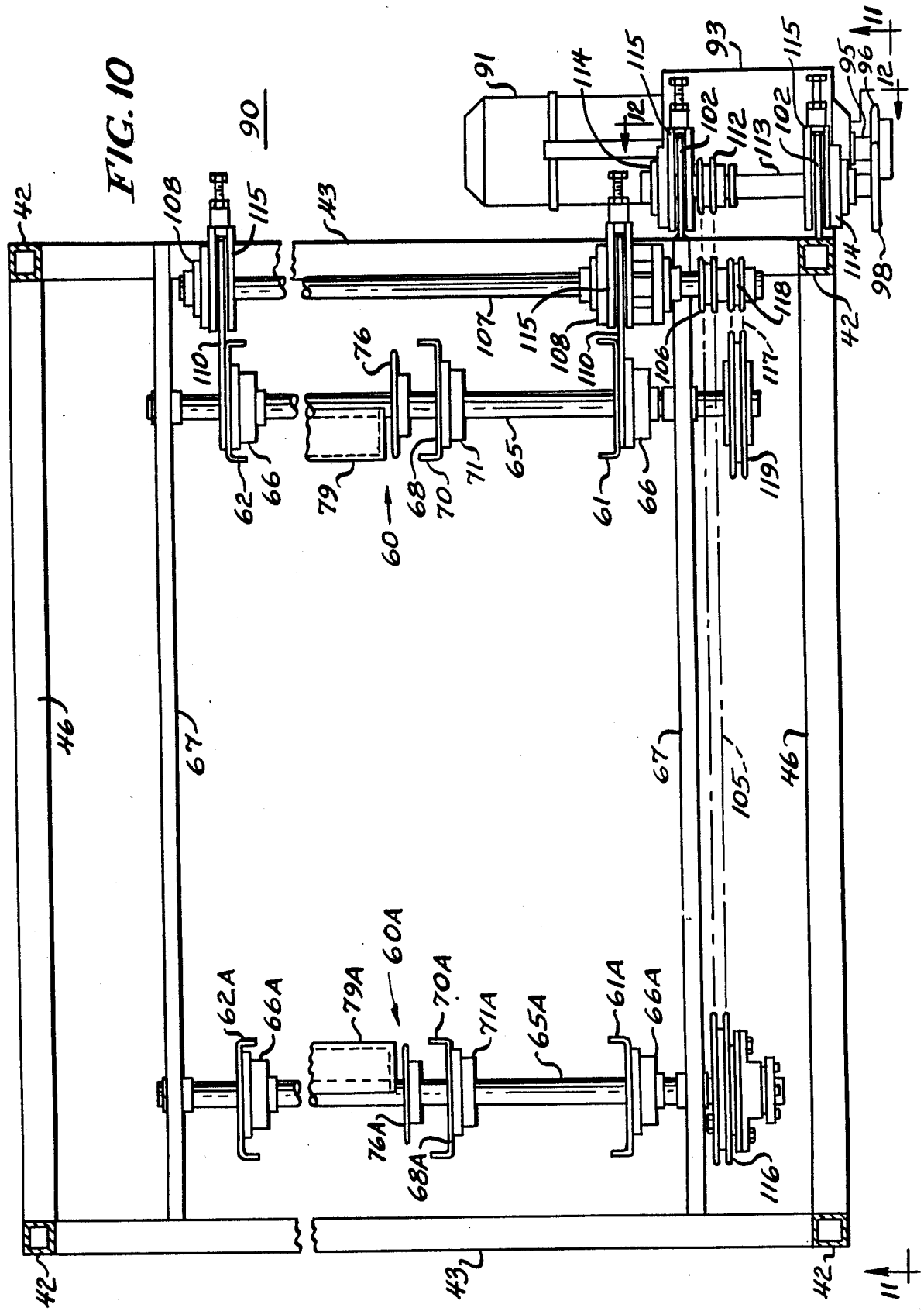
FIG. 10 is a further enlarged fragmentary view in horizontal section of the stack elevator drive assembly of the unstacking apparatus of FIG. 3, taken generally along the line 10—10 therein.
Figure 11:
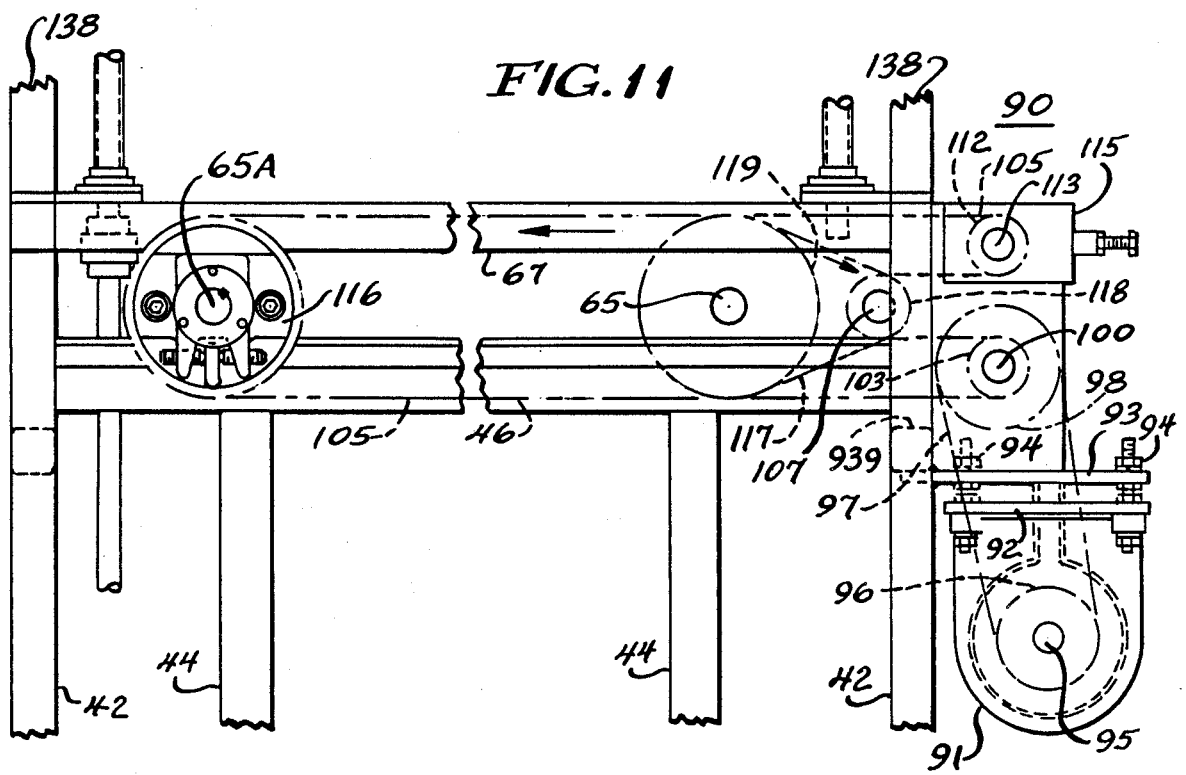
FIG. 11 is a fragmentary end elevational view of the drive assembly of FIG. 10, taken generally along the line 11—11 therein.
Figure 12:
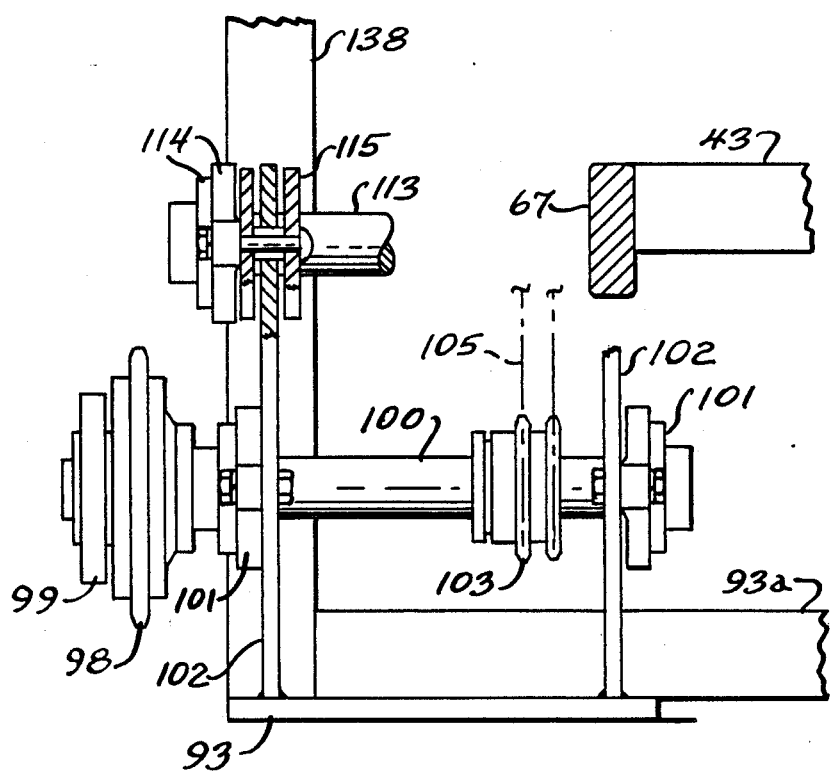
FIG. 12 is a still further enlarged fragmentary view in vertical section of a portion of the drive assembly of FIG. 10, taken generally along the line 12—12 therein, with portions broken away more clearly to show the structure.

Referring now also to FIGS. 10–12, the elevator assemblies 60 and 60A share a common drive assembly 90, which includes an electric drive motor 91 carried by a rectangular base plate 92. The base plate 92 is supported beneath a rectangular support plate 93 by suitable fasteners 94, the support plate 93 being fixedly secured to a support rail 93a of the frame 41. The drive motor 91 has an output shaft 95 which carries a sprocket 96 which is coupled by an endless drive chain 97 to a sprocket 98 of a torque limiter 99 carried by an idler shaft 100. The idler shaft 100 is rotatably mounted in bearings 101 carried by a pair of upstanding rectangular mounting plates 102, fixedly secured to the support plate 93. Also carried by the idler shaft 100 between the mounting plates 102 is a sprocket 103 (FIG. 12) around which is wrapped an endless double chain 105 which constitutes the main drive chain for the assembly 90. The double chain 105 is also trained around the inside of a sprocket 106 (FIG. 10) which is carried by an elongated takeup shaft 107 which is rotatably mounted in bearings 108, respectively carried by a pair of mounting plates 110 carried by the frame 41. The double chain 105 is next trained around the outside of a sprocket 112 which is carried by a short take-up shaft 113 disposed vertically above the idler shaft 100 and rotatably mounted in bearings 114 carried at the upper ends of the mounting plates 102. Also carried by the plates 102 and 110 are take-up assemblies 115 for adjusting the positions of the take-up shafts 113 and 107. The bearings 114 and 108 are respectively mounted on the take-up assemblies 115.

Next, the chain 105 is trained around a phasing sprocket 116 which is carried adjacent to one end of the other drive shaft 65A, the chain 105 then returning to the sprocket 98 on the idler shaft 100 to complete its loop. It will be appreciated that the loop of the double chain 105 has a reentrant portion around the take-up shaft 107. Thus, when the chain 105 moves in the direction of the arrow in FIG. 11, the drive shaft 65A will be rotated in a counterclockwise direction, while the take-up shaft 107 will be rotated in a clockwise direction. The take-up shaft 107 also carries a sprocket 118 which is coupled by an endless double chain 117 to a sprocket 119 on the drive shaft 65. Thus, the drive shaft 65 will rotate in the same direction as the idler shaft 100, i.e., it will rotate in the opposite direction from the drive shaft 65A. Accordingly, the drive assembly 90 effects a simultaneous rotation of the endless loops of the elevator chains 78 and 78A in opposite directions, as indicated by the arrows at the bottom of FIG. 3.

Preferably, a rectangular cover plate 120 (see FIG. 3) covers the front end of the frame 41 above the top rail 46. A photo eye PR-4 (FIG. 1) is disposed at the top of the stackreceiving bay 40 to indicate when the top basket 32 in the stack 31 has reached a height at which it can be removed by a transfer assembly 130.

Referring now in particular to FIGS. 1, 4 and 5. The transfer assembly 130 includes a rear frame 131 (FIG. 4) comprising a pair of upstanding posts 132, which are respectively disposed is alignment with the rear ones of the posts 42, and spaced rearwardly therefrom. Beams 133 (FIG. 5) interconnect the upper ends of the posts 132 with the rear ones of the posts 42, intermediate the upper and lower ends thereof. Projecting upwardly from the beams 133 are four upstanding posts 134 arranged at the corners of a rectangle, the posts 134 on each side of the frame 131 being interconnected with each other and with the rear ones of the posts 42 by intermediate support beams 135 and upper support beams 136 (FIG. 5). A plurality of vertically spaced-apart cross bars 137 interconnect the rear ones of the posts 132 (FIG. 4). Extending upwardly from the rear ones of the posts 134 and from the front ones of the posts 42 are four corner posts 138 which define the corners of an upper rectangular frame. The upper ends of the front and rear ones of the posts 138 are interconnected by end rails 139, while the upper ends of the side ones thereof are interconnected by side rails 140. The upper support beams 136 are respectively continuous with the upper ones of the side bars 43 of the frame 41, and are interconnected with the side rails 140 by a plurality of longitudinally spaced-apart upstanding spacer posts 141. Also, beams 142 interconnect the posts 134 at each side of the rear frame 131.

The transfer assembly 130 includes an endless chain conveyor assembly, generally designated by the numeral 145, which is substantially of the type disclosed in the aforementioned U.S. Pat. No. Re. 31,858, the disclosure of which is incorporated herein by reference. Accordingly, only so much of the endless chain conveyor assembly 145 will be described herein, as is necessary for an understanding of the present invention. The endless chain conveyor assembly 145 includes a drive motor 146 with is mounted on a support bracket 147 (FIG. 4) carried by one of the support beams 136. The output shaft of the motor 146 carries a drive sprocket 148 which is coupled by an endless chain 149 (FIG. 5) to a sprocket 150 mounted on one end of a main drive shaft 151.

The drive shaft 151 extends laterally across the entire width of the unstacking apparatus 30, and is preferably divided into three sections which are interconnected by two double-chain couplings 152. Each of the chain couplings 152 is of known construction, comprising a pair of sprockets, one on each of the abutting section ends, which are spanned by a common double chain which encircles the sprockets, providing a coupling of limited flexibility between the shaft sections. The drive shaft 151 also carries a drive sprocket 153 which engages a first endless drive chain 154, which in turn engages other sprockets to define an endless loop, as will be described below. Secured to the other end of the main drive shaft 151 is a sprocket 155 which is coupled by an interconnect chain 156 to another sprocket 157 on a stub shaft 158 which is disposed substantially parallel to the main drive shaft 151. Also carried by the stub shaft 158 is a drive sprocket 159 which engages a second endless drive chain 160, which in turn engages other sprockets to define a second endless loop parallel to that of the first drive chain 154.

The drive chains 154 and 160 respectively define parallel endless loops, which are spaced laterally from each other. Both chains move around the loop in a clockwise direction, as viewed in FIG. 1, each loop being defined by a pickup sprocket 161 disposed at a pickup location or station adjacent to the top of the stack-receiving bay 40, idler sprockets 162 and 163 disposed along the top of the transfer assembly frame, a discharge sprocket 164 disposed at a discharge location or station, and an idler sprocket 165. Chain guides 161a guide the chains 154 and 160 from the drive sprockets 153 and 159 to the pickup sprockets 161, while chain guides 165a guide the chains from the discharge sprockets 164 to the idler sprockets 165 (see FIG. 5). The pickup sprockets 161 and the discharge sprockets 164 all have the same radius. Disposed adjacent to the pickup location is a bracket 166 which carries an actuator bar 167 which projects laterally inwardly from one side of the frame, while adjacent to the discharge location is a bracket 168 which carries a actuator bar 169 which projects laterally inwardly from the opposite side of the frame, for a purpose to be explained more fully below.

Mounted between the drive chains 154 and 160 are a plurality of basket carriers, each generally designated by the numeral 170, and substantially equidistantly spaced apart along the path defined by the chains 154 and 160. The number of carriers 170 may vary depending upon the length of the path, and in the disclosed embodiment there are four such carriers, all of which are of substantially the same type as those disclosed in the aforementioned U.S. Pat. No. Re. 31,858, wherefore only so much of the construction thereof will be described herein as is necessary for an understanding of the present invention.

Each of the carriers 170 includes an elongated frame 171, which is preferably substantially rectangular in plan view, and is disposed substantially horizontally in use. The frame 171 is provided with couplers 172 and 173 which respectively project laterally outwardly from opposite ends thereof, with the coupler 172 being disposed at a front corner of the frame 171 while the coupler 173 is disposed at a rear corner thereof, for coupling respectively to the offset chains 154 and 160. Each of the couplers 172 and 173 accommodates a pivotal movement about a horizontal axis therethrough. Thus, as the carriers 170 are moved along the transfer path, the pivots of the couplers 172 and 173 are spaced apart and parallel so as to define a plane which remains horizontal, so that the carriers 170 undergo a purely translational, non-swinging movement, remaining horizontal throughout the path, as is explained in greater detail in the aforementioned U.S. Pat. No. Re. 31,858.

Each of the carriers 170 includes a pair of grippers 174 and 175 which respectively depend from the frame 171 adjacent to opposite ends thereof and are pivotally movable between a support position, wherein the grippers 174 and 175 are inclined inwardly toward each other, and a release position, wherein they are inclined outwardly away from each other. The grippers 174 and 175 are interconnected by a linkage (not shown) so that they move simultaneously, the linkage including vertically disposed and shiftable actuator pins 177 and 178, which are respectively disposed adjacent to the opposite ends of the frame 171 for engagement, respectively, with the actuator bars 167 and 169.

The couplers 172 and 173 are so arranged that the pivot axes thereof are spaced from the associated chains 154 and 160 inwardly of the loops defined thereby a distance substantially equal to the radius of the pickup and discharge sprockets 161 and 164. Thus, as is explained in greater detail in the aforementioned U.S. Pat. No. Re. 31,858, as the couplers 172 and 173 move through transfer portions of the chain paths around the pickup sprockets 161, the carrier frame 171 remains stationary at the pickup location and, similarly, as the couplers 172 and 173 move around the discharge sprockets 164, the carrier frame 171 remains stationary at the discharge location.

In operation, as a carrier 170 approaches the pickup location, the actuator pin 177 thereof, which is disposed in its downwardly extending position, strikes the actuator bar 167 and is driven upwardly to the position illustrated in the upper portion of FIG. 4, thereby shifting the grippers 174 and 175 from their release condition to their support condition and shifting the actuator pin 178 to its downwardly extending position. As the grippers 174 and 175 move to their support position, they move into the slots 33a in the end walls 33 of the topmost laterally-oriented basket 32 in the stack 31 (the second basket from the top of the stack), which is supported on the elevator assembly 60 in the stackreceiving bay 40. Thus, the carrier 170 picks up that basket and the longitudinally oriented basket resting thereon, i.e., the top two baskets in the stack, as can best be seen in FIG. 4. These baskets are then carried upwardly and rearwardly along the top of the transfer loop, as indicated by the arrow in FIG. 1, and then downwardly to the discharge location. As the carrier 170 approaches the discharge location, the downwardly projecting actuator pin 178 engages the actuator bar 169 to drive it upwardly, thereby shifting the grippers 174 and 175 to their release position, as illustrated in the lower portion of FIG. 4, for releasing the carried baskets 32. As the actuator pin 178 is shifted upwardly, the actuator pin 177 is shifted downwardly, so that it will be in position for engagement with the actuator bar 167, when the carrier 170 returns to the pickup location.

The transfer assembly 130 also includes a limit switch LS-3 positioned near the idler sprockets 165. In use, in the event that a pair of baskets fails to be discharged at the discharge location, they will trip the limit switch LS-3 to signal trouble in the system, as will be explained more fully below. The assembly also includes proximity switches PX-1 and PX-2, respectively disposed just ahead of the pickup location and the discharge location so as to be tripped by a carrier 170 to signal its approach to those locations.

Referring now in particular to FIGS. 1, 2, 4, 5, and 13, the unstacking apparatus 30 also includes a discharge assembly, generally designated by the numeral 180. The discharge assembly 180 includes an upper discharge conveyor 181, which is carried by the rear frame 131 immediately beneath the discharge location of the transfer assembly 130, and extends laterally thereof, projecting outwardly beyond one side of the frame, as can best be seen in FIG. 4. The conveyor 181 includes a pair of cross bars 182 mounted on the rear frame (one shown in FIG. 4). Projecting inwardly from the cross bars 182 are support struts 183, which carry side panels 184 which define the side walls of the conveyor 181 (see FIGS. 4 and 5). The conveyor 181 includes a pair of laterally spaced-apart endless conveyor tracks 185 which are trained around sprockets (not shown), the forward ones of which are carried by a sprocket shaft 187 which is driven by an associated drive motor 186 (FIG. 4). The tracks 185 are spaced apart a distance slightly greater than the width of one of the baskets 32 but less than the length thereof. A photo eye PR-5 (FIG. 1) is disposed with its beam across the conveyor 181.

The discharge assembly 180 also includes a lower conveyor 190 disposed immediately beneath the upper conveyor 181 and parallel thereto. The lower conveyor 190 includes a pair of cross bars 192 mounted on the rear frame 131 (one shown in FIG. 4), from which support struts 193 extend laterally inwardly for respectively carrying side panels 194 which define the side walls of the conveyor 190. The conveyor 190 includes an endless conveyor belt 195 which is trained around rollers (not shown), the belt 195 having a width slightly greater than the length of one of the baskets 32. The conveyor 190 extends laterally outwardly from the rear frame 131 well beyond the discharge end of the upper conveyor 181, as can best be seen in FIGS. 2 and 4. A photo eye PR-6 (FIG. 1) extends across the lower conveyor 190 inside the frame 131. Photo eyes PR-7, PR-8, PR-9, and PR-10 also extend across the lower conveyor 190, for purposes to be explained more fully below. While the conveyor 190 is shown for simplicity, as comprising a single section, it may be provided in two end-to-end sections. The sections of the conveyor 190 are respectively driven by drive motors 199 and 199a, diagrammatically illustrated in FIGS. 2 and 13.

The discharge assembly 180 also includes an inclined chute or ramp 200 (see FIG. 4) which projects downwardly from the discharge end of the upper conveyor 181 to the lower conveyor 190. The upper end of the chute 200 is carried by the frame of the conveyor 181 while the lower end thereof is supported on struts 201 carried by the frame of the conveyor 190. Thus, it will be appreciated that baskets 32 exiting the end of the upper conveyor 181 slide down the chute 200 and merge on to the lower conveyor 190. Disposed adjacent to the discharge end of the lower conveyor 190 is an overhead indexer plate 204 which is actuated by a solenoid valve SV-5 between a raised open position and a lowered closed position. Also mounted on one of the side panels 194 of the lower conveyor 190 is a pivot assembly 205, which is preferably disposed just beneath the chute 200. The pivot assembly 205 includes a bracket 206 carried by the side panel 194 and on which is mounted a pivot arm 207 which extends laterally inwardly over the belt 195. A shock absorber 208 is provided to accommodate a limited pivotal movement of the arm 207. A guide rail 209 is also provided on the lower conveyor 190 (see FIG. 13) downstream of the pivot assembly 205 for narrowing the path along the lower conveyor 190 toward the exit end thereof.

In operation, when a set of two cross-nested baskets 32 is released by a carrier 170 at the discharge location, the bottom one thereof, which is oriented longitudinally of the discharge conveyors 181 and 190, drops between the tracks 185 of the upper conveyor 181 onto the belt 195 of the lower conveyor 190. The upper basket 32, which is oriented transversely of the upper conveyor 181, is caught on the tracks 185 thereof. The speeds of the upper and lower conveyors 181 and 190 may be adjusted so that the upper basket 32 will slide down the chute 200 onto the lower conveyor 190 just ahead of or just behind the lower basket. The pivot arm 207 projects over the lower conveyor belt 195 a distance such as to engage the longitudinally oriented lower basket 32 and turn it substantially 90° as the belt 195 passes therebeneath. But the transversely oriented upper basket 32 passes over and is unaffected by the pivot arm 207. Thus, all of the baskets 32 are oriented the same way as they leave the exit end of the lower conveyor 190 and they are all moved over to the left side of the belt 195 by the guide rail 209, as can be seen in FIG. 13.

The baskets 32 frequently carry debris or residue from the baking operations. In order to remove this debris, there is also provided a tumbler assembly, generally designated by the numeral 210 and illustrated in FIG. 14. More specifically, there is disposed beneath the exit end of the lower conveyor 190 an inclined conveyor 212. As the baskets 32 exit the conveyor 190 they fall onto the inclined conveyor 212, which is traveling downwardly so as to grab the lower end of the basket 32 and flip it upside down. A stop wall 211 is provided to prevent the basket from flipping off the end of the inclined conveyor 212. As the basket 32 is inverted, any debris therein will be dumped onto the inclined conveyor 212.

Disposed beneath the exit end of the inclined conveyor 212 is another inclined conveyor 214, situated so that as the inverted basket 32 falls thereonto it is again tumbled or inverted back to its upright position. A stop wall 213 is provided to keep the baskets 32 from tumbling off the end of the inclined conveyor 214. Spaced from the exit end of the inclined conveyor 214 by a gap 215 is an inclined conveyor 216, which is supported on legs 217. The gap 215 is substantially less than the width of the basket 32, so that the basket 32 easily spans the gap 215 while any of the debris which has been dumped onto the conveyors 212 and 214 falls through the gap 215 into an underlying container 219. The baskets 32 are then carried from the inclined conveyor 216 to associated processing equipment (not shown). The conveyors 212, 214 and 216 are respectively provided with drive motors 212a, 214a and 216a, which are diagrammatically illustrated in FIG. 2.

Figure 15:
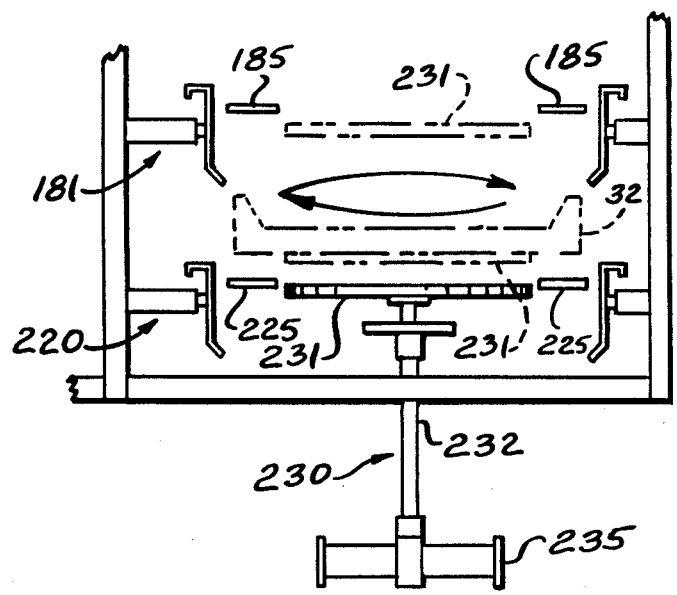
FIG. 15 is a fragmentary, side elevational view in partial vertical section, similar to FIG. 5, of a discharge assembly constructed in accordance with and embodying the features of a second embodiment of the present invention, and illustrating various positions of the assembly.
Figure 16:
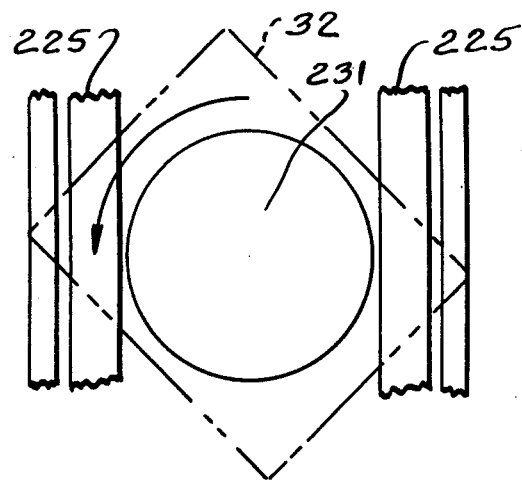
FIG. 16 is a top plan view of the turntable of the discharge assembly of FIG. 15.

Referring to FIGS. 15 and 16, there is illustrated an alternative embodiment of the discharge assembly 180, in which there is substituted for the lower conveyor 190 an alternate lower conveyor 220, which is in the form of a pair of laterally spaced-apart conveyor tracks 225, respectively vertically aligned with the tracks 185 of the upper conveyor 181. Carried by the rear frame 131 beneath the lower conveyor 220 is a turntable assembly 230, which includes a circular turntable platform 231 disposed substantially horizontally and mounted on a vertical shaft 232 which is, in turn, coupled to a drive assembly 235. The drive assembly 235 effects limited rotational movement of the shaft 232 about its longitudinal axis and also effects axial movement thereof among an upper basket-receiving position and an intermediate reorienting position, illustrated in broken lines in FIG. 15, and a lower discharge position illustrated in solid line in FIG. 15. It will be appreciated that the diameter of the platform 231 is slightly less than the gap between the conveyor tracks 225, so that it may be raised and lowered therebetween.

In operation, the platform 231 is normally disposed in its upper basket-receiving position just beneath the upper conveyor tracks 185. Thus, when two baskets are released from a carrier 170 at the discharge location, the lower basket 32 drops between the upper conveyor tracks 185 onto the platform 231. The platform 231 is then lowered to its intermediate position disposed between the upper and lower conveyors 180 and 220, and is rotated 90° so that the basket 32 is reoriented transversely of the lower conveyor 220. The platform 231 is then lowered to its lower discharge position beneath the lower conveyor tracks 225, thereby depositing the basket on the tracks 225. Thus, all of the baskets on the lower conveyor 220 will be oriented in the same direction. In this embodiment the pivot assembly 205 may be dispensed with, since any further change in the orientation of the baskets 32 may be effected by downstream processing equipment.

Figure 17A:
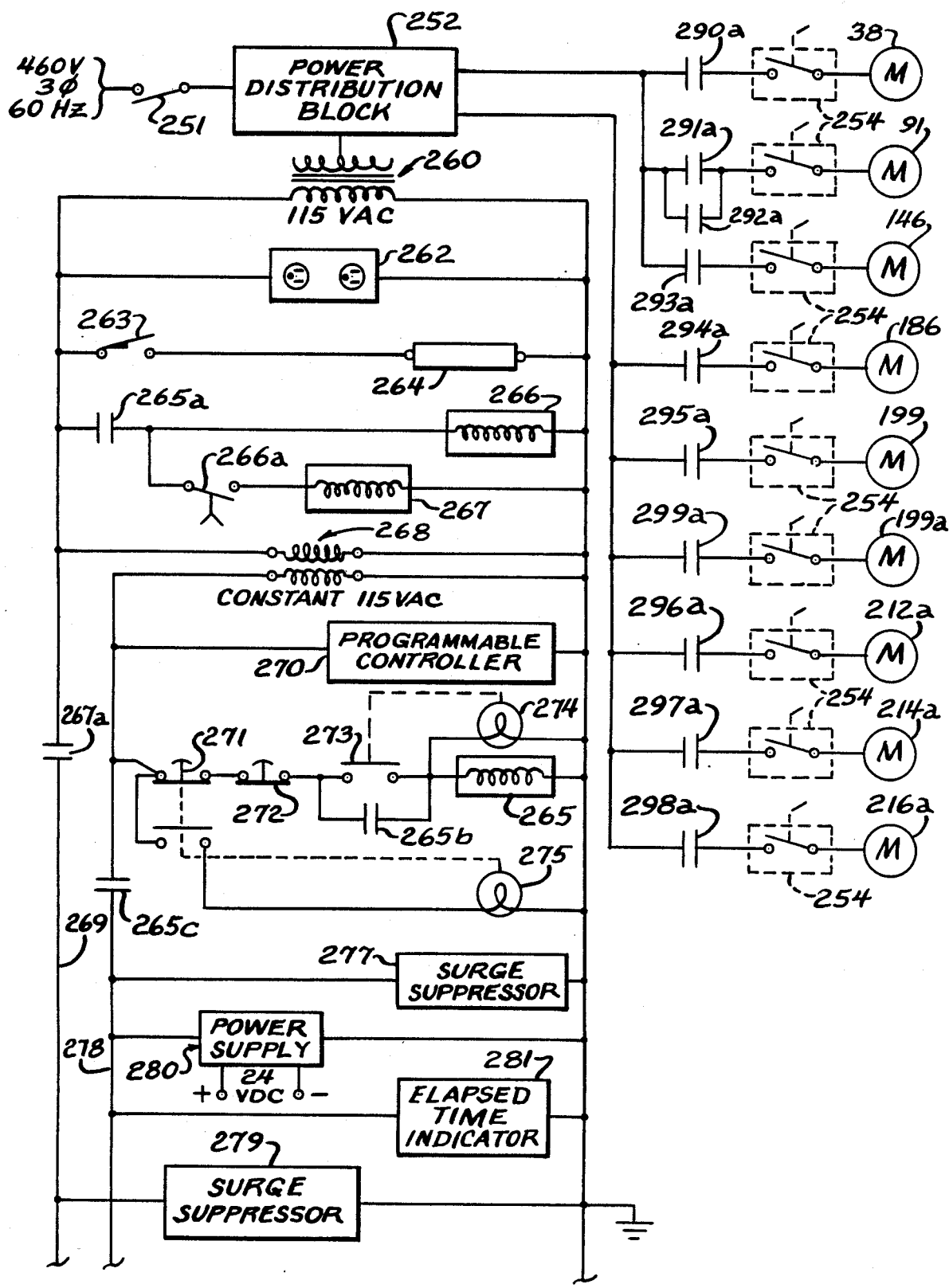
FIGS. 17A through 17C are a schematic circuit diagram of the electrical control circuitry for the unstacking apparatus of FIGS. 1 and 2.
Figure 17B:
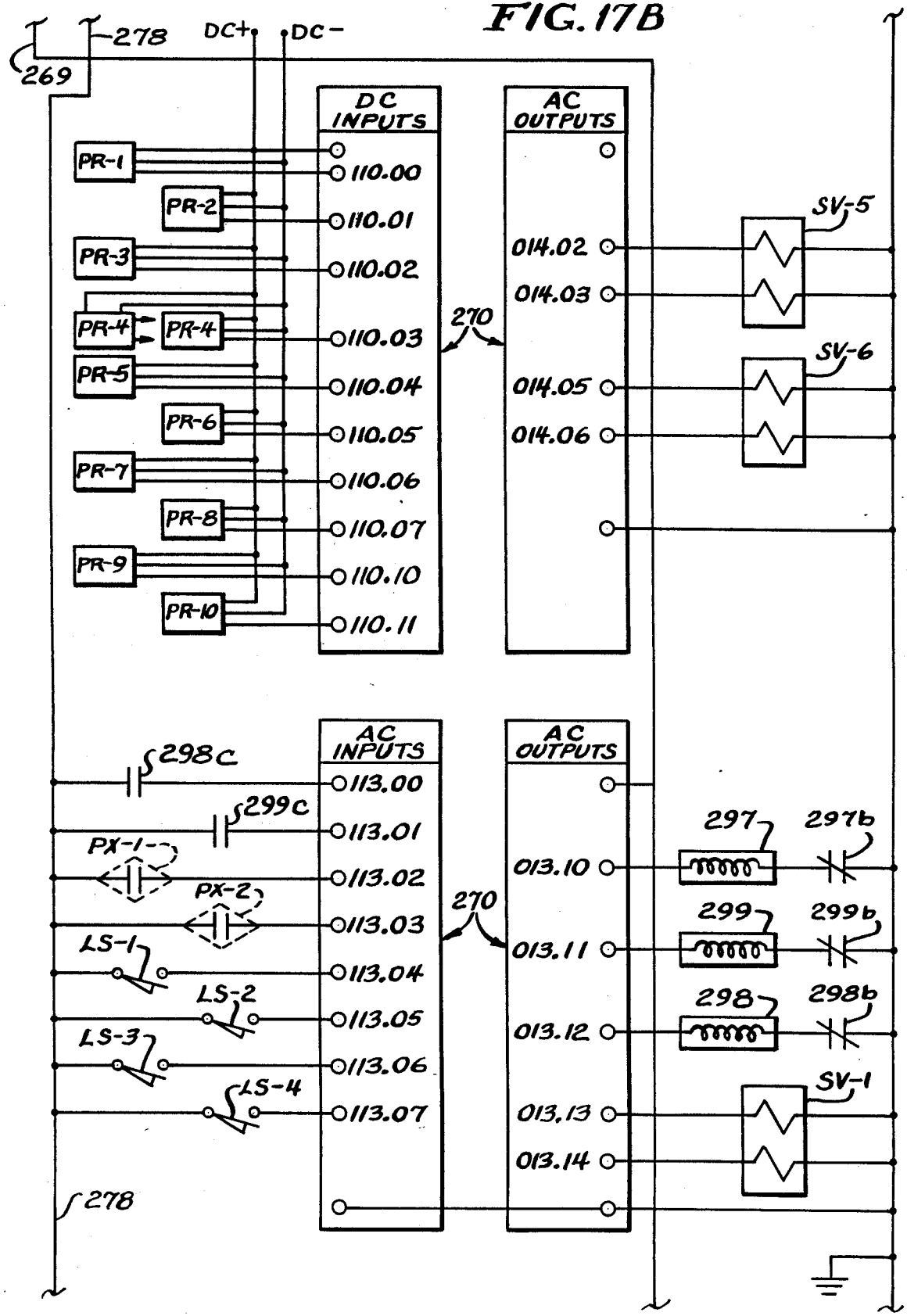
Figure 17C:
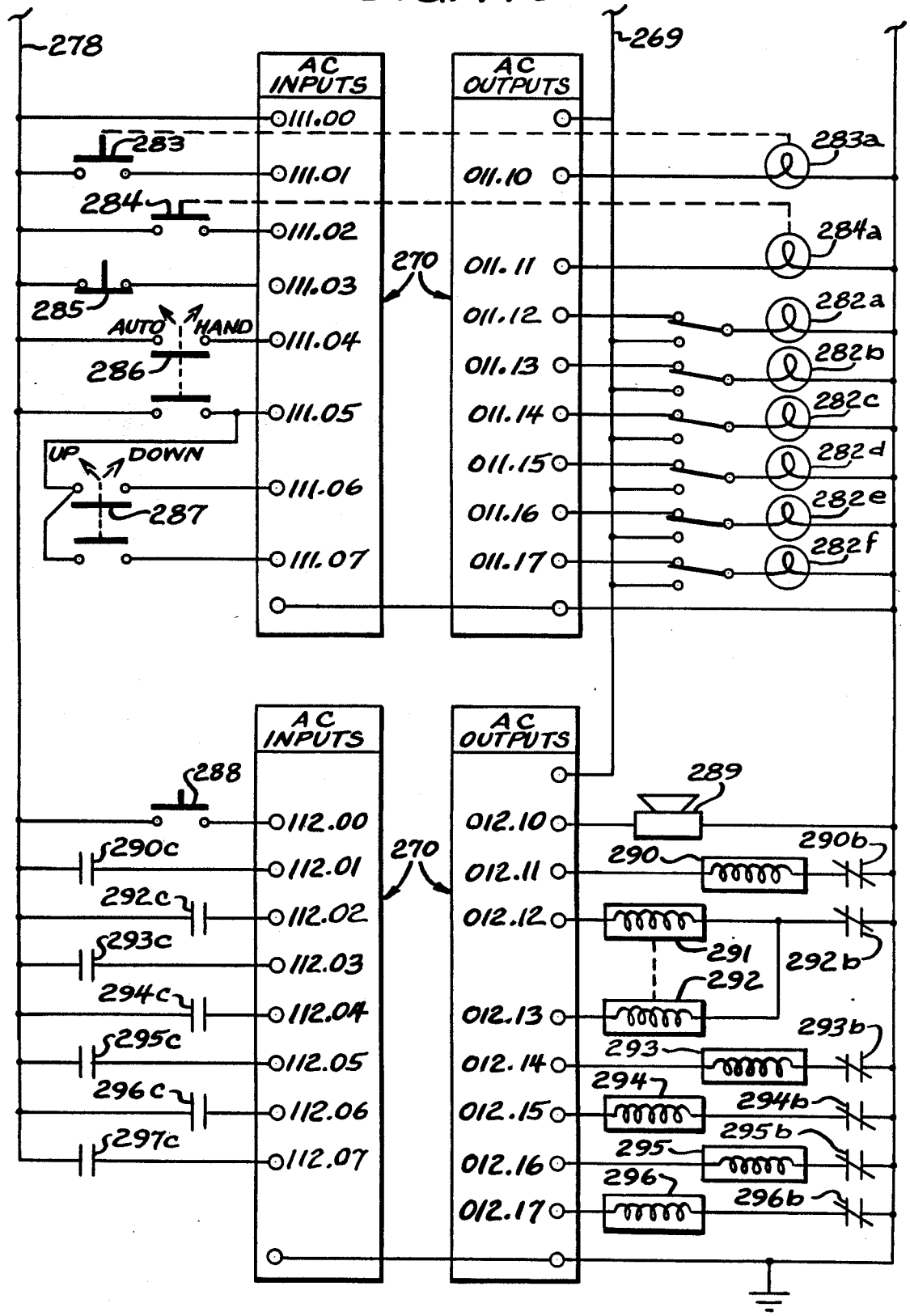

Referring now to FIGS. 17A-17C, there is illustrated an electrical control circuit 250 for controlling the operation of the unstacking apparatus 30. The motors 38, 91, 146, 186, 199, 199a, 212a, 214a, and 216a, which respectively drive the infeed conveyor 35, the elevator assembly 60, the transfer assembly 130, the upper discharge conveyor 181, the sections of the lower discharge conveyor 190 and the inclined tumbler conveyors 212, 214 and 216, are preferably all driven from one phase of a suitable 460 volt, three-phase, 60 Hz. supply. The control circuit 250 includes a programmable controller 270, operating under stored program control, which may be any of a number of different types of commercially available controllers, such as that sold by Allen-Bradley Co. under the designation PLC 2/16. In FIGS. 17B and 17C, the programmable controller 270 has been illustrated in two sets of blocks, the left-hand ones having AC and DC input terminals and the right-hand one having AC output terminals. Associated with each such terminal is a five-digit number designating the software address of the function associated with that terminal. The same five-digit numbers are used in the program software, as set forth in the Microfiche Appendix. Input function addresses begin with the numeral "1", while output function addresses begin with the numeral "0".

The 460 volt supply is coupled through a control switch 251 and a power distribution block 252 to the drive motors, respectively through normally-open relay contacts 290a through 299a and manual disconnect switches 254. More specifically, one phase of the 460 volt supply powers the motors 38, 91 and 146, while a second phase powers the motors 186, 199, 199a, 212a, 214a, and 216a associated with the discharge assembly 180 and the tumbler assembly 210. The third phase is applied to the primary winding of a stepdown transformer 260, the secondary of which provides a 115 VAC supply for the remainder of the circuitry.

Connected across the 115 VAC supply is a set of plugs 262 used for programming the programmable controller 270. Also connected across the 115 VAC supply is a series combination of a normally-closed, held-open switch 263 and a fluorescent light fixture 264. Also connected in series across the 115 VAC supply are the normally-open contacts 265a of a master input relay 265 and the coil of a master output delay relay 266. Connected in series across the coil of the relay 266 are its normally-opened, timed closed contacts 266a and the coil of a master output relay 267. Also connected across the 115 VAC supply is the primary winding of a constant voltage control transformer 268, the secondary of which provides a controlled source of 115 VAC. The programmable controller 270 is connected across the controlled 115 VAC supply. Also connected in series across this controlled supply are one pole of a double-pole, doublethrow push-button emergency stop switch 271, a normallyclosed push-button power down switch 272, a normally-open push-button power up switch 273 and the winding of the master input relay 265. Connected in parallel with the relay winding 265 is a pilot light 274 which is mounted in the power-up switch 273. Connected in parallel with the power-up switch 273 are normally-open latching contacts 265b of the master input relay 265. Also connected in series across the controlled 115 VAC supply is the normally-open second pole of the emergency stop switch 271 and a pilot light 274 mounted therein.

Also connected in series across the controlled 115 VAC supply are the normally-open contacts 265c of the master input relay 265 and an input power surge suppressor 277, the junction therebetween being connected to a line 278. Connected across the surge suppressor 277 is a DC power supply 280 which produces a 24 VDC supply at its DC+ and DC-output terminals. Also connected in parallel with the input power surge suppressor 277 is an elapsed time indicator 281. Connected in series across the 115 VAC supply of the secondary of the transformer 260 are the normally-open contacts 267a of the master output relay 267 and an output power surge suppressor 279, the junction therebetween being connected to a line 269. The 24 VDC supply is applied to the programmable controller 270, as indicated in FIGS. 17B and 17C. The controlled and uncontrolled 115 VAC supplies are also applied, respectively, via the lines 278 and 269, to the programmable controller 270, as indicated in FIGS. 17B and 17C.

The programmable controller 270 is connected in circuit with a number of control elements. The photo eyes PR-1 through PR-10 are connected in parallel across the 24 VDC supply and the outputs thereof are respectively connected to DC input terminals of the programmable controller 270. Respectively connected between the ground line of the 115 VAC supplies and AC output terminals of the programmable controller 270 are a group of indicator lights 282a through 282f of the "push-to-test" type. Connected between the line 278 and respective AC input terminals of the programmable controller 270 are a normally-open push-button discharge start switch 283 and a normally-open push-button unstacker start switch 284. Respectively disposed in the switches 283 and 284 are pilot lights 283a and 284a, which are connected between the ground line of the 115 VAC supplies and respective AC output terminals of the programmable controller 270. Also connected between the line 278 and respective AC input terminals of the programmable controller 270 are a normally-closed push-button stop switch 285 and the two poles of a double-pole, double-throw push-button "Auto-Hand" switch 286. The AC input terminal to which the "Hand" pole of the switch 286 is connected is also connected through the poles of a double-pole, double-throw elevator "Up-Down" push-button switch 287 to other respective AC input terminals of the programmable controller 270. Also connected between the line 278 and an AC input terminal of the programmable controller 270 is a normally-open push-button alarm silence switch 288.

Connected between an AC output terminal of the programmable controller 270 and the ground terminal of the 115 VAC supplies is an alarm horn 289. Also connected to respective AC output terminals of the programmable controller 270 are control relays 290 through 299, which are connected through their normally-closed overload contacts 290b and 292b through 299b to the ground terminal of the 115 VAC supplies.

The relays 290 through 299 also respectively have normally-open overload contacts 290c and 292c through 299c which are connected between line 278 and respective AC input terminals of the programmable controller 270.

Connected between the ground terminal of the 115 VAC supplies and respective AC output terminals of the programmable controller 270 are a clutch/brake SV-1 having "Run" and "Stop" conditions for controlling the operation of the elevator drive assembly 90, and a dual-acting solenoid valve SV-5 having "Open" and "Closed" conditions for controlling the operation of the indexer 204. Also connected between AC input terminals of the programmable controller 270 and the line 278 are the proximity switches PX-1 and PX-2 and the limit switches LS-1 through LS-4.

It is believed that the operation of the control circuit 250 in conjunction with the associated program software set forth in the Microfiche Appendix will be readily understood by those skilled in the art. However, there follows a simplified explanation of the overall operation of the unstacking apparatus 30, with reference to the control circuit 250. When the switch 251 is closed, 115 VAC power is delivered to the transformer 268 via the transformer 260, and controlled 115 VAC power is delivered to the programmable controller 270. When the Power-Up switch 273 is momentarily depressed, the master input relay 265 is energized. This closes its contacts 265b for latching it on, and also closes its contacts 265a for energizing the time delay relay 266 and closes its contacts 265c for applying controlled 115 VAC to the DC power supply 280 across the surge suppressor 277. Thus, upon closure of the relay contacts 265c, 24 VDC power is supplied to the programmable controller 270 and controlled 115 VAC power is also supplied to the programmable controller 270 via line 278. In particular, a signal will be input to the programmable controller 270 at the address 111.00, and will also be input at the address 111.03 through the closed stop switch 285. After a predetermined time delay, the contacts 266a of the time delay relay 266 will close, energizing the master output relay 267, for closing its contacts 267a, thereby applying 115 VAC power to the programmable controller 270 via line 269 across the surge suppressor 279. When the Power-Up switch 273 is closed, its pilot light 274 turns on, and is held on after the switch 273 is released, by closure of the latching contacts 265b of the relay 265.

The unstacking apparatus 30 may be operated in either an automatic or a manual mode, depending upon the condition of the switch 286. Normally, this switch will be actuated to its "Auto" position for inputting a signal to the programmable controller 270 at address 111.04, for conditioning the system for automatic operation.

When the Unstacker Start switch 284 is closed, a signal is input to the programmable controller 270 at its address 111.02, and a signal is output at address 011.11 for energizing the pilot light 284a of the switch 284. Closure of the switch 284 also outputs a signal from the programmable controller 270 at address 012.11 for energizing the relay 290, thereby closing its contacts 290a for energizing the motor 38 to drive the infeed conveyor 35. Closure of the switch 284 also outputs a signal from the programmable controller 270 at address 013.14 for engaging the brake of the clutch/brake SV-1. Simultaneously, a signal is output from the programmable controller 270 at address 012.12 for energizing the relay 291, thereby closing its contacts 291a for energizing the motor 91 to drive the elevator drive assembly 90 in a stack-lifting direction. Closure of the switch 284 also causes a signal to be output from the programmable controller 270 at address 012.14 for energizing the relay 293, thereby closing its contacts 293a to energize the motor 146 for driving the continuous chain conveyor assembly 145.

When the discharge start switch 283 is closed, a signal is input to the programmable controller 270 at its address 111.01 and it outputs a signal at its address 011.10 to energize the pilot light 283a in the switch 283. Closure of the switch 283 also causes the programmable controller 270 to output a signal at its address 012.15 for energizing the relay 294, which closes its contacts 294a to energize the motor 186 to drive the upper discharge conveyor 181. Closure of the switch 283 also causes the programmable controller 270 to output signals at its addresses 012.16, 012.17, 013.10, 013.11 and 013.12, for respectively energizing the relays 295 through 299, which respectively close their contacts 295a through 299a to respectively energize the motors 199, 212a, 214a, 216a, and 199a for driving the two sections of the lower discharge conveyor 190 and the tumbler assembly conveyors 212, 214 and 216. Closure of the switch 283 also causes a signal to be output from the programmable controller 270 at its address 014.05 to actuate the solenoid valve SV-6 to move the gate 58 to its open condition. The infeed conveyor motor 38, the discharge conveyor motors 186, 199 and 199a and the tumbler assembly conveyor motors 212a, 214a, and 216a all run continuously. In order to stop them, the stop switch 285 is opened, thereby removing the input signal from the programmable controller 270 at address 111.03, which in turn removes the output signals for deenergizing the relays 290 and 294 through 299.

After the switches 283 and 284 have been closed, in the automatic mode cross-nested stacks 31 of baskets 32 are loaded from the conveyors of associated handling equipment (not shown) onto the stack infeed conveyor 35, which carries them toward the stack-receiving bay 40. The blockage of the photo eye PR-1 indicates the presence of a stack 31 on the infeed conveyor 35. When the conveyor 35 is running and the photo eye PR-1 is not blocked, a signal may be transmitted to associated equipment (not shown) to indicate that a stack is needed. When the stack 31 approaches the stack-receiving bay 40, it blocks the photo eye PR-2, thereby inputting a signal to the programmable controller 270 at address 110.01. If, at this time, the photo eye PR-3 is unblocked, indicating that there is no stack in the stack-receiving bay 40, and the limit switch LS-2 has been closed by a flight assembly 80 on its way down, indicating that the following flight assembly 80 has elevated sufficiently for the next stack to enter the bay area, thereby inputting a signal to the programmable controller 270 at address 113.05, then the stack-receiving bay 40 is clear and the stack 31 will continue thereinto on the bay conveyor 50.

As the stack enters the bay 40 it closes the limit switch LS-4, and the stack continues into the bay until it blocks the photo eye PR-3. When the stack blocks the photo eye PR-3, if it is properly aligned it will clear and reopen the limit switch LS-4. This causes a signal to be output from the programmable controller 270 at its address 013.13 to engage the clutch of the clutch/brake SV-1 for driving the elevator drive assembly 90. If the limit switch LS-4 had remained closed when the photo eye PR-3 was blocked, this would indicate that the stack was misaligned, and this continued input signal at the address 113.07 of the programmable controller 270 would prevent it from engaging the clutch of the clutch brake SV-1. It will also output a signal at address 012.10 for energizing the alarm horn 289, and a signal would be output at address 011.17 for energizing the problem light 282f.

If, at the time the stack 31 blocks the photo eye PR-2, either the photo eye PR-3 remains blocked, indicating that a previous stack is still in the bay 40, or the limit switch LS-2 has not been tripped, indicating that the previous stack has not been elevated sufficiently to allow another stack to enter the bay, then the programmable controller 270 will output a signal at its address 014.06 to close the gate 58 and prevent the stack 31 from entering the bay 40. When the bay is clear the programmable controller will again output a signal at its address 014.05 to open the gate 58 and allow the stack to enter the bay 40.

When a properly aligned stack has been positioned in the bay 40, the elevator drive assembly 90 will move a carrier flight assembly 80 into position to lift the stack 31 until the top two baskets 32 thereof block the photo eye PR-4. This inputs a signal to the programmable controller 270 at its address 110.03, causing it to output a signal at the address 013.14 to engage the brake of the clutch/brake SV-1 and stop the elevator assembly 80. In this condition, the top two baskets 32 of the stack 31 are in position to be removed by the transfer assembly 130. As indicated above, when a transfer carrier 170 approaches the pickup location, it closes the proximity switch PX-1, inputting a signal to the programmable controller 270 at its address 113.02. If, at this time, the photo eye PR-4 remains clear, indicating that the baskets are not in position to be unstacked, the programmable controller 270 will remove the output signal at its address 012.14, thereby deenergizing the relay 293 and the drive motor 146 of the continuous chain conveyor assembly 145.

When the photo eye PR-4 is closed, the continuous chain conveyor assembly 145 will restart and the carrier 170 will move to its pickup location, and as it does so the actuator pin 177 will engage the actuator bar 167 for the grippers 174 and 175 to their support condition, engaging them in the slots 33a of the second basket 32 from the top of the stack 31, which is disposed transversely of the transfer assembly path, as is illustrated in FIG. 4. It will be appreciated that, as is explained in detail in the aforementioned U.S. Pat. No. Re. 31,858, because the pivot axes of the couplers 172 and 173 are spaced from the chains 154 and 160 a distance equal to the radii of the sprockets 161, the carrier 170 will remain motionless at the pickup location as the couplers 172 and 173 are moved around the periphery of the sprockets 161 by the chains 154 and 160, thereby facilitating pickup of the top two baskets from the stack 31.

The transfer assembly 130 carries the top two baskets from the stack to the discharge location, as described above. As they are lifted from the stack 31, the photo eye PR-4 clears, thereby disengaging the brake and engaging the clutch of the clutch/brake SV-1 and restarting the elevator assembly 60, to raise the stack 31 further until the photo eye PR-4 is again blocked, at which point the elevator assembly again stops to await the next carrier 170 to pick up the top two baskets from the stack. The system continues unstacking in this manner until the limit switch LS-2 is again tripped by the other flight assembly 80 of the elevator assembly 60, indicating that the bottom of the stack has reached sufficient height to permit entry of another stack into the bay 40. If at this time, no stack is not in position to enter the bay 40, as indicated by the photo eye PR-2 being unblocked, then a signal will be output at address 011.16 to light the lamp 282c, indicating that a stack is needed, and the horn 289 will sound.

When a carrier 170 reaches the discharge location, the actuator pin 178 pin engages the actuator bar 169 for moving the grippers 174 and 175 to their release condition and dropping the carried baskets onto the discharge assembly 180. Again, it will be appreciated that the carrier 170 remains stationary in its discharge location while the couplers 172 and 173 are carried around the periphery of the sprockets 164 by the chains 154 and 160, thereby facilitating accurate discharge of the baskets 32. As is explained above, when the baskets 32 are released, the bottom one falls between the tracks 185 of the upper discharge conveyor 181 onto the belt 195 of the lower discharge conveyor 190, while the upper basket 32 is caught on the tracks 185 of the upper discharge conveyor 181. The upper basket then moves down the chute 200 onto the lower discharge conveyor 190 and is reoriented by the pivot arm 207, as explained above.

As the carrier 170 is approaching the discharge location, it closes the proximity switch PX-2, inputting a signal to the programmable controller 270 at its address 113.03. If, at this time, either of the photo eyes PR-5 or PR-6 has been blocked for about one and one-half seconds, indicating that the baskets are still on the upper or lower discharge conveyor 181 or 190, then the programmable controller 270 will remove its output signal at its address 012.14 to deenergize the relay 293 and the transfer drive motor 146 for stopping the transfer assembly 130. Also, a signal will be output at address 011.14 to light the lamp 282c and the horn 289 will sound. The transfer assembly 130 will remain stopped until the photo eyes PR-5 and PR-6 are cleared, at which time it will restart to move the carrier 170 to the discharge location.

The empty carrier 170, after having dropped its baskets at the discharge location, will return to the pickup location, closing the proximity switch PX-1 in the process. When the switch PX-1 is closed, the transfer assembly 130 will stop unless there are baskets in position for pickup at the pickup location, as indicated by blockage of the photo eye PR-4. When the flight assembly pair 80, 80A carrying a stack has moved beyond its maximum height, it closes the limit switch LS-1, indicating that the next flight assembly pair 80, 80A is in position for lifting the next stack. If no stack is in position in the bay 40, as indicated by the photo eye PR-3 being unblocked, then a signal will be output at address 012.13, engaging the brake of the clutch/brake SV1 for stopping the elevator assembly 60. If the limit switch LS-1 is not tripped within a predetermined time after closure of the limit switch LS-2, then the elevator assembly 60 will stop and the alarm lamp 282d will be lit and the horn 289 will sound.

If the photo eyes PR-8 and PR-9 are simultaneously blocked, this indicates that two baskets are abutting at the exit end of the lower discharge conveyor 190. To prevent them from interfering with each other in the tumbler assembly 210, the solenoid valve SV-5 is actuated by a signal at address 014.03 to close the indexer 204 to hold up the second basket until the photo eye PR-9 clears.

In the event that the carrier 170 malfunctions and fails to release the baskets at the discharge location, then as the carrier 170 leaves the discharge location, the baskets carried thereby will close the limit switch LS-3, inputting a signal to the programmable controller 270 at its address 113.06, which will also serve to stop the transfer assembly 130.

If the transfer assembly 130 is running and the proximity switch PX-1 has not detected a carrier 170 for approximately seven and one-half seconds, this would indicate that the torque limiter on the transfer assembly 130 is slipping or that one or both of the conveyor chains 154 or 160 is broken. In this event, the programmable controller 270 will operate to energize the indicator light 282d and to deenergize all of the drive motors of the assembly 30. The entire assembly 30 will be shut down also in the event of a motor overload of any of the drive motors. In this event, the appropriate overload contacts 290b through 299b will open and the corresponding one of the relays 290–299 will be deenergized, and the corresponding one of the normally-open overload contacts 290c through 299c will close inputting a signal to the programmable controller 270 at the corresponding one of its input addresses 012.01 through 113.01 and the indicator light 282b will be energized.

When the alarm horn 289 sounds in the event of any of the foregoing alarm conditions, it can be silenced by closing the alarm silence switch 288.

When the unstacking apparatus 30 is operating in the manual mode, the elevator assembly 60 and the transfer assembly 130 may be manually controlled. Thus, by actuation of the switch 287, the elevator assembly 60 may be operated to raise a stack of baskets until the top pair of baskets blocks the photo eye PR-4, or to lower an unwanted stack of baskets to the bay conveyor 50. Similarly, a tote-reverse switch (not shown) may be provided to permit operating of the transfer assembly 130 in a reverse direction to help clear a jam or accumulation of baskets at the discharge location. The programmable controller 270 has internal batteries and, when their charge becomes low the programmable controller 270 outputs a signal at its address 011.12 to energize the warning lamp 282a to signal the user that the batteries need to be replaced within seven days, or memory will be lost in the programmable controller 270.

To shut the unstacking apparatus 30, the power down switch 272 is momentarily opened, deenergizing the relay 265, which opens its contacts 265a, 265b and 265c, thereby deenergizing the relays 266 and 267 and opening contacts 267a. Thus, the DC power supply 280 is deenergized and 115 VAC power is removed from the system.

Control circuitry has not been shown for controlling the operation of the turntable assembly 230, but those skilled in the art will understand how to modify the control circuit to provide for control of the turntable assembly 230.

While the present invention has been disclosed in connection with an apparatus for unstacking articles two-at-a-time from a cross-nested stack, it will be appreciated that it could also be used for unstacking articles one-at-a-time.

From the foregoing, it can be seen that there has been provided an improved unstacker assembly which provides for efficient unstacking of articles from a cross-nested stack, and which does not require rotation of the stack or of the transfer apparatus which removes articles from the stack, but only requires reorientation of selected individual articles after they have been delivered to a discharge station.

We claim:

1. Apparatus for unstacking elongated articles from a stack of articles in which each article has the longitudinal axis thereof disposed perpendicularly to the longitudinal axis of adjacent articles in the stack, said apparatus comprising: transfer means for removing the top two articles from the stack simultaneously and conveying them to a discharge station, means at the discharge station for separating the two removed articles, means for reorienting one of the separated articles so that its longitudinal axis extends in substantially the same direction as that of the other separated article, and discharge means for carrying the two articles sequentially from the discharge station.

2. The apparatus of claim 1, and further comprising means for elevating the stack in response to removal of articles from the top thereof.

3. The apparatus of claim 2, wherein said means for elevating includes control means for elevating the stack a distance corresponding to the decrease in height of the stack resulting from removal of the articles from the top thereof.

4. The apparatus of claim 2, and further comprising transport means for moving a stack of articles to said means for elevating.

5. The apparatus of claim 1, wherein said transfer means includes means for effecting a translational movement of the removed articles from the top of the stack to the discharge station.

6. The apparatus of claim 5, wherein said transfer means includes two laterally spaced-apart parallel endless conveyor members respectively moving along parallel paths and each having a pivot fixed thereon for movement therewith, the axes of said pivots being spaced apart and parallel so as to define a plane which remains in a predetermined fixed orientation as said conveyor members move along the paths, and an article carrier supported by and between said conveyor members for pivotal movement only with respect to the pivot axes, said carrier including support means movable between a support condition for supporting associated articles thereon and a release condition for releasing the associated articles.

7. The apparatus of claim 6, wherein said parallel paths include transfers portions respectively defining arcs of equal parallel circles, said axes being parallel to the axes of said circles and respectively spaced from said conveyor member paths a distance equal to the radii of said circles in directions so as to be respectively coaxial with said circles when the adjacent parts of said conveyor members are in said transfer portions of said paths.

8. The apparatus of claim 1, wherein said means for separating includes means for vertically separating the removed articles.

9. Apparatus for unstacking elongated articles from a stack of articles in which each article has the longitudinal axis thereof disposed perpendicularly to the longitudinal axis of adjacent articles in the stack, said apparatus comprising: transfer means for removing the top two articles from the stack simultaneously and conveying them to a discharge station, upper and lower discharge conveyors disposed at said discharge station beneath said transfer means, at least said upper discharge conveyor having a pair of tracks laterally spaced apart a distance greater than the width of the articles but less than the length thereof, means for releasing the removed articles from said transfer means at the discharge station and causing them to be lowered so that the upper article is deposited on said upper discharge conveyor while the lower article passes between the tracks of said upper discharge conveyor and is deposited on said lower discharge conveyor, means for reorienting one of the removed articles so that its longitudinal axis extends in substantially the same direction as that of the other article, and means for carrying the article sequentially from said upper and lower discharge conveyors.

10. The apparatus of claim 9, wherein the articles are dropped by gravity from said transfer means to said discharge conveyors.

11. The apparatus of claim 9, and further comprising support means at said discharge station for receiving the articles from said transfer means, said support means including vertically movable means for lowering at least one of the articles onto said discharge conveyors.

12. The apparatus of claim 11, wherein each of said discharge conveyors includes a pair of laterally spaced-apart tracks, said support means being vertically movable between the tracks of said discharge conveyors.

13. The apparatus of claim 9, and further comprising means for merging the flow of articles from said discharge conveyors into a single stream of articles.

14. The apparatus of claim 13, wherein said reorienting means includes a member disposed in the path of the merged stream of articles for selectively reorienting alternate ones of the articles.

15. The apparatus of claim 9, wherein each of said discharge conveyors includes a pair of laterally spaced-apart tracks, and further comprising turntable means disposed between the tracks of said discharge conveyors and having a substantially vertically disposed axis of rotation, said turntable means being rotatable about the axis of rotation thereof and being axially movable among upper and lower and intermediate positions, said turntable means in the upper position thereof being disposed adjacent to said upper discharge conveyor for receiving the lower one of the two removed articles from said transfer means in an orientation such that the longitudinal axis thereof is disposed longitudinally of said lower discharge conveyor, movement of said turntable means from its upper position to an intermediate position between said upper and lower discharge conveyors serving to deposit the upper article on said upper discharge conveyor, said turntable means in said intermediate position thereof being rotatable substantially 90° about the axis of rotation thereof for reorienting the lower article so that its longitudinal axis is disposed laterally of the lower discharge conveyor, movement of said turntable means from said intermediate position thereof to a lower position beneath said lower discharge conveyor serving to deposit the lower article on said lower discharge conveyor.

* * * * *